United States Patent
Ume et al.

(10) Patent No.: US 9,885,563 B2
(45) Date of Patent: Feb. 6, 2018

(54) DYNAMIC DIGITAL FRINGE PROJECTION TECHNIQUES FOR MEASURING WARPAGE

(71) Applicant: Georgia Tech Research Corporation, Atlanta, GA (US)

(72) Inventors: Ifeanyi Charles Ume, Atlanta, GA (US); Sungbum Kang, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 15/517,934

(22) PCT Filed: Oct. 10, 2014

(86) PCT No.: PCT/US2014/060014
§ 371 (c)(1),
(2) Date: Apr. 7, 2017

(87) PCT Pub. No.: WO2016/057043
PCT Pub. Date: Apr. 14, 2016

(65) Prior Publication Data
US 2017/0254642 A1    Sep. 7, 2017

(51) Int. Cl.
*G01B 11/25* (2006.01)
*G01B 11/30* (2006.01)

(52) U.S. Cl.
CPC .......... *G01B 11/2527* (2013.01); *G01B 11/25* (2013.01); *G01B 11/2513* (2013.01);
(Continued)

(58) Field of Classification Search
CPC ..... G01B 11/24; G01B 11/25; G01B 11/2513; G01B 11/2518; G01B 11/2527;
(Continued)

(56) References Cited

U.S. PATENT DOCUMENTS

| 6,564,166 B1 | 5/2003 | Ume et al. |
| 7,570,370 B2 * | 8/2009 | Steinbichler ....... G01B 11/2513 356/603 |

(Continued)

OTHER PUBLICATIONS

International Search Report and Written Opinion for International Patent Application No. PCT/2014/ 060014 dated Jan. 22, 2015.
(Continued)

*Primary Examiner* — Gordon J Stock, Jr.
(74) *Attorney, Agent, or Firm* — Troutman Sanders LLP; Ryan A. Schneider

(57) ABSTRACT

Dynamic digital fringe projection (DDFP) techniques for measuring warpage. The DDFP technique generates a dynamic fringe pattern, in which a proper fringe intensity distribution is dynamically determined based on the surface reflectance of an unpainted sample in order to obtain better fringe image contrasts. The DDFP technique includes the automatic segmentation method to segment the chip package and PWB regions in an unpainted PWB assembly PWBA image. It also includes calibration methods to compensate the mismatches in coordinates and intensities between the projected and captured images.

20 Claims, 27 Drawing Sheets

(52) U.S. Cl.
CPC ...... *G01B 11/2518* (2013.01); *G01B 11/2536* (2013.01); *G01B 11/2545* (2013.01); *G01B 11/306* (2013.01)

(58) Field of Classification Search
CPC ............ G01B 11/2531; G01B 11/2536; G01B 11/254; G01B 11/2545; G01B 11/30; G01B 11/303; G01B 11/306
USPC .......................................... 356/600–605, 610
See application file for complete search history.

(56) References Cited

U.S. PATENT DOCUMENTS

| | | | | |
|---|---|---|---|---|
| 8,411,284 | B2* | 4/2013 | Chen | G01B 11/2509 348/228.1 |
| 8,462,357 | B2* | 6/2013 | Rodrigue | G01B 11/245 356/601 |
| 9,389,068 | B2* | 7/2016 | Ri | G01B 11/2513 |
| 9,423,245 | B2* | 8/2016 | Keranen | G01B 11/245 |
| 2006/0072122 | A1 | 4/2006 | Hu et al. | |
| 2007/0115484 | A1* | 5/2007 | Huang | G01B 11/2527 356/604 |
| 2009/0128648 | A1 | 5/2009 | Ikeda et al. | |
| 2009/0238449 | A1 | 9/2009 | Zhang et al. | |
| 2010/0195114 | A1* | 8/2010 | Mitsumoto | G01B 11/245 356/601 |
| 2014/0064603 | A1 | 3/2014 | Zhang et al. | |
| 2015/0070472 | A1* | 3/2015 | Chen | G01B 11/2531 348/47 |
| 2015/0233707 | A1* | 8/2015 | Huntley | G01B 11/254 348/136 |
| 2016/0078610 | A1* | 3/2016 | Rudd | G06T 7/0004 348/87 |

OTHER PUBLICATIONS

Tan et al. Warpage Measurement of Board Assemblies Using Projection Moiré System With Improved Automatic Image Segmentation Algorithm. IEEE Transactions on Advanced Packaging, vol. 31, No. 3., Aug. 2008, pp. 147-453 [online], [retrieved on Nov. 12, 2014]. Retrieved from the Internet <URL: http://ieeexplore.ieee.org/xpls/abs_all.jsp?arnumber=4250122><DOI: 10.1109/TADVP.2008.927855>.

Powell et al. Simultaneous Measurement of PWB and Chip Package Warpage Using the Projection Moiré Technique and Automatic Image Segmentation. IEEE Electronic Components and Technology Conference, 2006. pp. 607-613 [online], [retrieved on Nov. 12, 2014]. Retrieved from the Internet <URL: http://ieeexplore.ieee.org/xpls/abs_all.jsp?arnumber=1645712><DOI: 10.1109/ECTC.2006.1645712>.

* cited by examiner

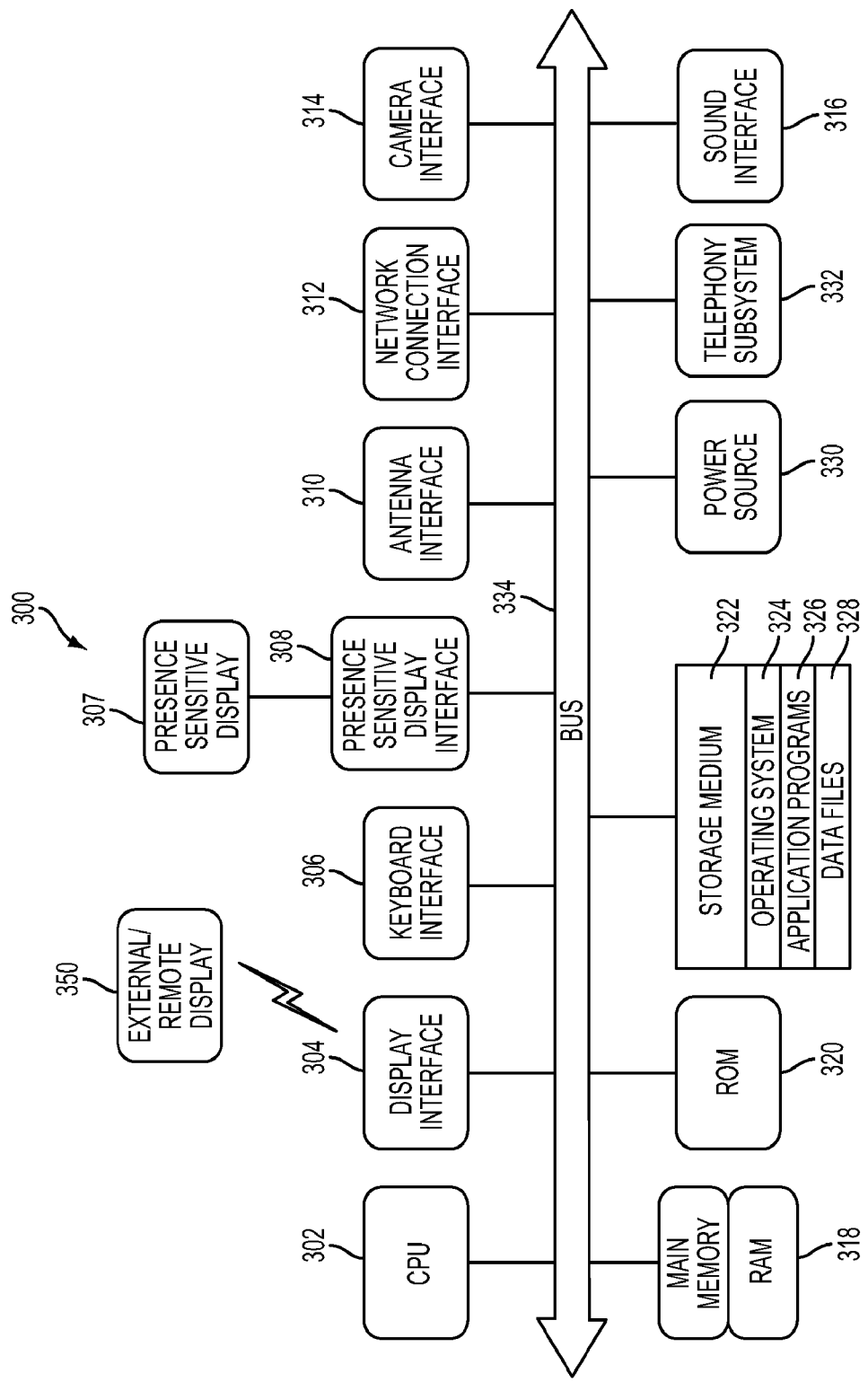

DYNAMIC DIGITAL FRINGE PROJECTION TECHNIQUES FOR MEASURING WARPAGE

BACKGROUND OF THE INVENTION

1. Field of the Invention

The present invention relates generally to devices, systems and methods for measuring warpage of a sample, for example, a printed wiring board assembly (PWBA).

2. Description of Related Art

Over the years, chip package technologies have been improving in order to achieve smaller package sizes and higher density circuitry while requiring superior reliability. To meet the increased reliability requirements of chip packages, one crucial issue is warpage induced by the coefficient of thermal expansion (CTE) mismatches within chip packages and printed wiring boards (PWBs). Warpage takes place primarily during the reflow process when chip packages are soldered to PWBs in the reflow oven and later cooled down to room temperature as the assembled boards exit the oven. If induced warpage in chip packages or PWBs exceeds critical values, one of the resultant effects is component misregistration during component placement and insertion processes. The presence of warpage can also cause reliability problems in chip packages such as die cracking, underfill delamination, creep and voids in solder bumps, and fatigue failure in solder bumps resulting from high residual stresses. Several of these conditions are illustrated in FIG. 1.

The effects of warpage on the failure of chip packages have rendered warpage control a crucial process during the reflow process. To address this concern, the first step that can be taken is to measure warpage accurately and quickly. Several techniques for measuring the warpage of chip packages and boards (i.e., PWBs and PWB assemblies) have been developed. Among the various warpage measurement techniques, the digital fringe projection (DFP) technique has become popular for measuring the warpage of chip packages and boards because of its non-contact, full-field, and high-resolution measurement capabilities and the advancements in digital projection technology in recent years. The conventional measurement process using the DFP technique involves projecting sinusoidal fringe patterns onto the sample surface, capturing the fringe patterns reflected from the sample surface, which is phase modulated by the surface height distribution, generating a wrapped phase image from the captured fringe patterns by a fringe analysis method, unwrapping the wrapped phase to obtain a continuous phase distribution proportional to the surface height distribution, and converting the unwrapped phase distribution to the surface height distribution.

When using the DFP techniques for measuring the warpage of chip packages and boards, reflective painting is generally sprayed on the sample surface to ensure uniform surface reflectance and to obtain better fringe image contrasts in the measurement process. However, painted samples may no longer be re-used, and the spray-painting process is not suitable in assembly line.

It is the intention of the present invention to solve this problem and provide for such an industrial need with a dynamic digital fringe projection (DDFP) technique.

BRIEF SUMMARY OF THE INVENTION

Briefly described, in an exemplary form, the present invention comprises devices, systems and methods for measuring warpage of a sample, for example, a PWBA. When measuring an unpainted PWBA using the DFP technique, various surface reflectances of the chip packages and the PWB generally causes too dark or too bright regions in the PWBA fringe images. For example, when a dark fringe pattern is projected onto the PWBA, the PWB region of the PWBA fringe image is too dark for processing. On the other hand, when a bright and uniform fringe pattern is projected onto the PWBA, the package region of the PWBA fringe image is too bright for processing.

This problem is solved by the present invention by projecting a projected image (fringe pattern) that contains different intensities for the chip package and the PWB in order to obtain a fringe pattern image with improved fringe contrast.

The present invention can be used to measure the warpage of unpainted chip packages and boards on the order of the field of view of the camera. As used hereinafter, samples (i.e. chip packages and boards) are referred to as unpainted samples on the order of the field of view of the camera. The DDFP technique generates a dynamic fringe pattern, in which a proper fringe intensity distribution is dynamically determined based on the surface reflectance of an unpainted sample in order to obtain better fringe image contrasts. The DDFP technique includes the automatic segmentation method to segment the chip package and PWB regions in an unpainted PWB assembly image. It also includes calibration methods to compensate the mismatches in coordinates and intensities between the projected and captured images.

In an exemplary embodiment, the sample is a PWBA having one or more chip packages and a PWB.

Similarly, while the present invention is intended to be used to increase the reliability of chip package technology, the steps of projecting a dynamic fringe pattern upon the surface of a PWBA, segmenting the chip package and PWB regions, and determining warpage of the chip package(s) and the PWB of the PWBA via manipulation of the reflected image(s) from the PWBA, the present invention can work effectively well measuring warpage of samples having more broadly varying regions of surface reflectance that differ from one another, such that the convention digital fringe projection technique is inadequate, and the present dynamic digital fringe projection technique is advantageous.

The present invention becomes more robust with its inventive segmentation process to automatically segment the chip package and PWB regions having surface reflectances that differ from one another in appropriate degree that the present dynamic digital fringe projection technique provides superlative results.

In an exemplary embodiment, the present invention comprises a method for measuring warpage of a sample (for example, a PWBA) having a first region of a first surface reflectance (for example, a chip package) and a second region of a second surface reflectance (for example, a PWB) comprising projecting a dynamic fringe pattern onto the first and second regions, wherein the dynamic fringe pattern comprises an intensity distribution based upon the first surface reflectance and the second surface reflectance, capturing phase-shifted fringe images of the dynamic fringe pattern reflected from the first and second regions of the sample, generating a wrapped-phase image from the phase-shifted fringe images, unwrapping the wrapped-phase image to obtain an unwrapped-phase image, and converting the unwrapped-phase image into a displacement image indicative of warpage of the first region and the second region of the sample.

The present novel and non-obvious dynamic digital fringe projection can further comprise segmenting the sample into the first region and the second region prior to projecting the dynamic fringe pattern. Segmenting the sample can comprise capturing a capture image of the sample, smoothening the capture image using a Gaussian filter to generate at least two smoothened features, generating edges around the smoothened features using a Canny algorithm to generate an edged image having at least two edged regions, segmenting the edged regions in the edged image with labels using a region-growing algorithm to generate a label image having the first and second regions, and detecting the first and second regions in the label image using geometric analysis.

In another exemplary embodiment, the present invention comprises a method of measuring warpage of a sample having a first region of a first surface reflectance and a second region of a second surface reflectance comprising projecting a dynamic fringe pattern onto the first and second regions, wherein the dynamic fringe pattern comprises an intensity distribution based upon the first surface reflectance and the second surface reflectance, capturing phase-shifted fringe images of the dynamic fringe pattern reflected from the first and second regions of the sample, generating a wrapped-phase image from the phase-shifted fringe images, unwrapping the wrapped-phase image to obtain an unwrapped-phase image, and converting the unwrapped-phase image into a displacement image indicative of warpage of the first region and the second region of the sample.

In another exemplary embodiment, the present invention comprises a method of measuring warpage of at least a portion of a PWBA having a first region of a first surface reflectance and a second region of a second surface reflectance comprising projecting a dynamic fringe image onto the first and second regions, wherein the dynamic fringe image comprises an intensity distribution based upon the first surface reflectance and the second surface reflectance, capturing phase-shifted fringe images of at least a portion of the dynamic fringe image reflected from the first and second regions of at least a portion of the PWBA, generating a wrapped-phase image from the phase-shifted fringe images, unwrapping the wrapped-phase image to obtain an unwrapped-phase image, and converting the unwrapped-phase image into a displacement image indicative of warpage of the first region and the second region of at least a portion of the PWBA.

The invention can further comprise performing coordinate calibration between the projected dynamic fringe image and the captured phase-shifted fringe images, and/or performing intensity calibration between the projected dynamic fringe image and the captured phase-shifted fringe images.

In another exemplary embodiment, the present invention comprises a method of measuring warpage of a sample having a first region of a first surface reflectance and a second region of a second surface reflectance comprising segmenting the sample into the first region and the second region, generating a dynamic projected image, projecting the dynamic projected image onto the first and second regions, wherein the dynamic projected image comprises an intensity distribution based upon the first surface reflectance and the second surface reflectance, capturing phase-shifted images of the dynamic projected image reflected from the first and second regions of the sample, generating a wrapped-phase image from the phase-shifted images, unwrapping the wrapped-phase image to obtain an unwrapped-phase image, and converting the unwrapped-phase image into a displacement image evidencing warpage of the first region and the second region of the sample.

The present process of segmenting the sample is itself inventive, and can be used in other devices, systems and methods that can benefit from the disclosed segmentation technique.

The present invention can further comprise performing coordinate calibration between the projected dynamic fringe image and the captured fringe images.

The present invention can further comprise performing intensity calibration between the projected dynamic fringe image and the captured fringe images.

These and other objects, features and advantages of the present invention will become more apparent upon reading the following specification in conjunction with the accompanying drawing figures.

BRIEF DESCRIPTION OF THE DRAWINGS

FIG. 15 depicts a block diagram of an illustrative computing device according to an exemplary embodiment of the present invention.

DETAIL DESCRIPTION OF THE INVENTION

Figure 1A:
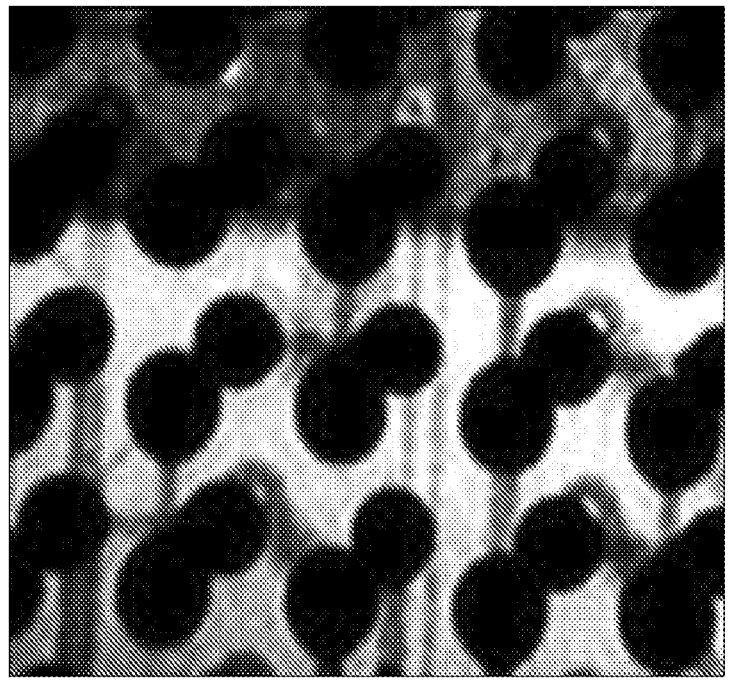
FIG. 1 are micrographs of (a) component misregistration, (b) die cracking, (c) underfill delamination, and (d) solder bump fatigue failure.
Figure 1B:
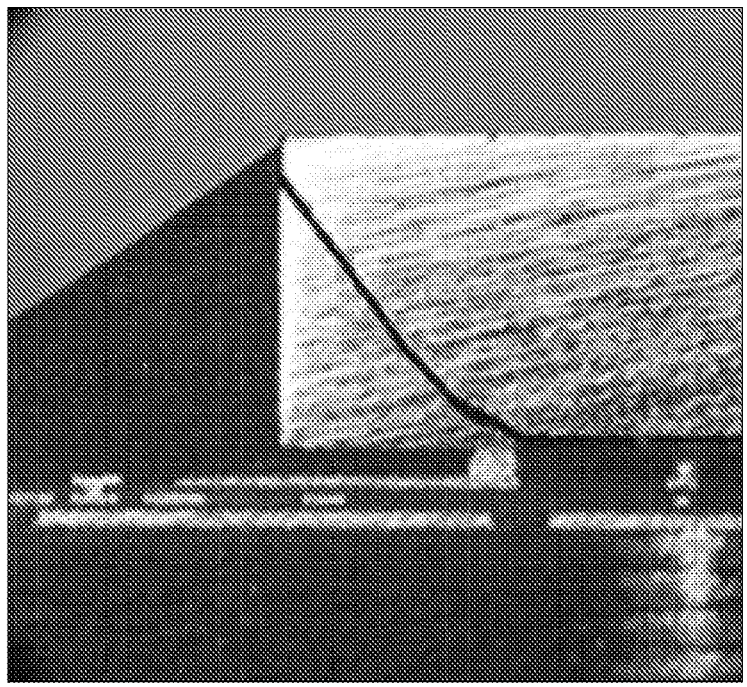
Figure 1C:
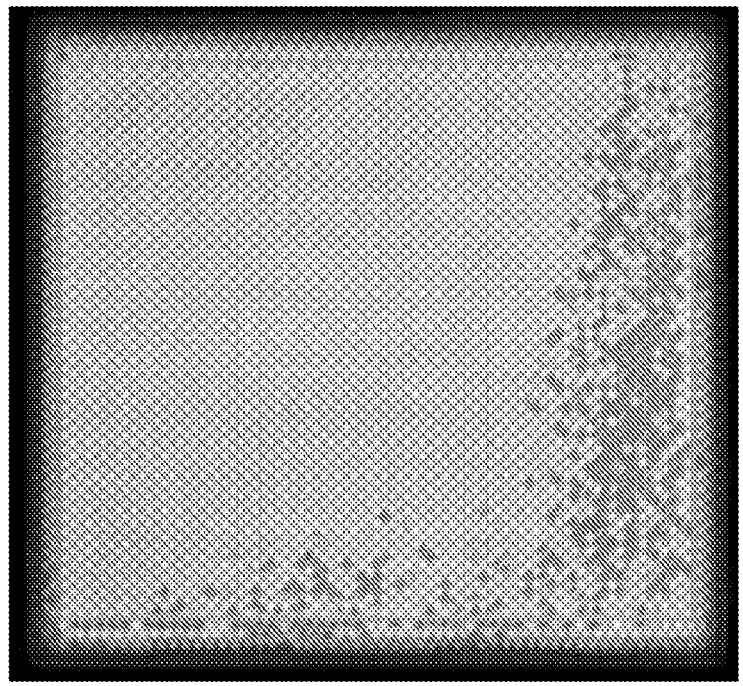
Figure 1D:
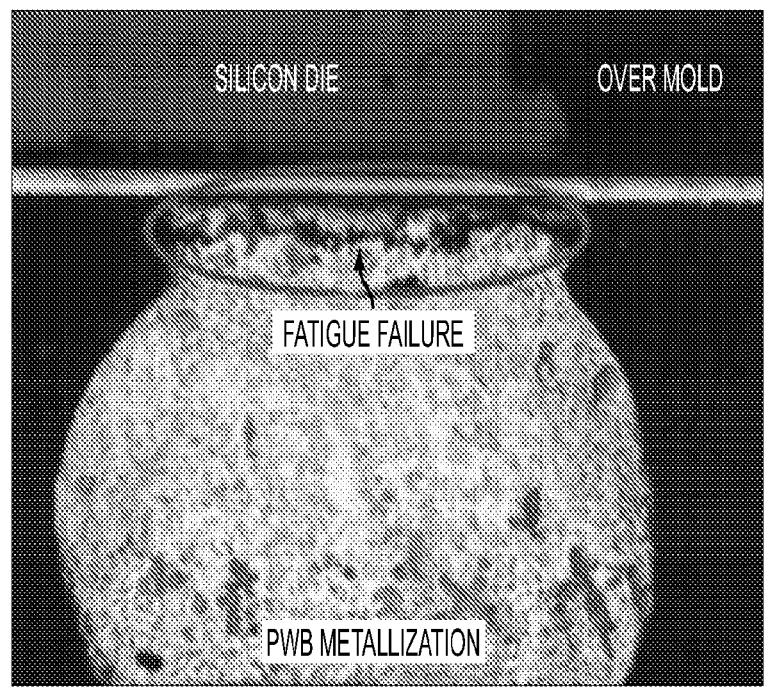

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention comprises devices, systems and methods for measuring warpage of a sample S using a data acquisition system 10. The data acquisition system 10 of FIG. 2 comprises a projecting device 12 to project dynamic fringe pattern upon at least a portion of the sample S, and a capturing device 14 to obtain phase-shifted fringe images reflected from at least a portion of the surface of the sample S. The data acquisition system 10 performs an interrogation and analysis process 20, which can include one or of the steps shown in FIG. 3.

The projecting device 12 projects a projected image on the sample S, and in an exemplary form can comprise a digital projector. The capturing device 14 captures/obtains a reflected image from the sample S, and in an exemplary form can comprise a charge coupled device (CCD) camera.

Interrogation and analysis process 20 can comprises step 100 of performing coordinate calibration between the projected and captured images (performed once), step 200 of segmenting the sample S (for example, having chip package and PWB regions in an unpainted PWBA image), step 300 of performing intensity calibration between the projected and captured images, step 400 of projecting dynamic fringe pattern (fringe pattern with various intensities) on the sample, step 500 of obtaining phase-shifted fringe images of the dynamic fringe pattern reflected from the sample S (increasing measurement resolution), step 600 of applying phase wrapping to the phase-shifted fringe images to obtain a wrapped phase image, step 700 of applying phase unwrapping to the wrapped phase image to obtain an unwrapped phase image, step 800 of transforming the unwrapped image to a displacement image, and step 900 of calculating warpage, if any, of the chip package and PWB from the displacement image.

Those of skill in the art will appreciate that the interrogation and analysis process 20 can incorporate complimentary steps or analyses under each main step, as defined previously, and can use alternative language to describe a step that in essence performs a similar function. For example, step 400 of projecting a dynamic fringe pattern can incorporate a predecessor step of generating the dynamic fringe pattern before its projection, such that step 400 comprises generating and projecting the dynamic fringe pattern. As another example, step 500 of obtaining phase-shifted fringe images can incorporate a predecessor step of shifting the phase of the dynamic fringe pattern before its capture. As another example, step 600 of applying phase wrapping to the phase-shifted fringe images to obtain a wrapped phase image can also be disclosed as step 600 of generating the wrapped phase image from the phase-shifted fringe images to obtain the wrapped phase image. Additional complimentary steps or analyses under each of these main steps will become apparent in appropriate disclosure herein of the present invention.

In an exemplary embodiment, the present invention comprises a method of measuring warpage of the sample S having a first region of a first surface reflectance and a second region of a second surface reflectance comprising projecting 400 the dynamic fringe pattern onto the first and second regions, wherein the dynamic fringe pattern comprises an intensity distribution based upon the first surface reflectance and the second surface reflectance, capturing 500 phase-shifted fringe images of the dynamic fringe pattern reflected from the first and second regions of the sample, generating 600 a wrapped-phase image from the phase-shifted images, unwrapping 700 the wrapped-phase image to obtain an unwrapped-phase image, and converting 800 the unwrapped-phase image into a displacement image indicative of warpage of the first region and the second region of the sample.

Figure 4:
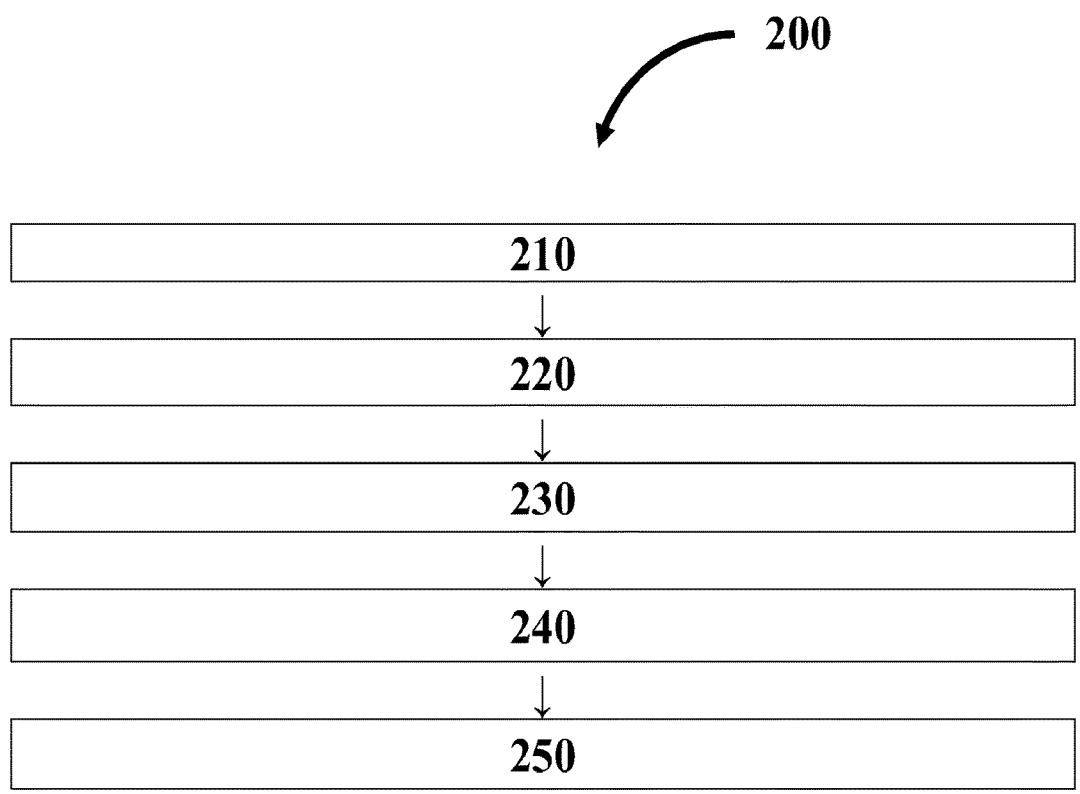
FIG. 4 is a flow diagram of a method of segmenting using a region growing method (RGM) that uses of the Canny and region-growing algorithms according to an exemplary embodiment of the present invention.

The present invention can further comprise segmenting 200 the sample S into the first region and the second region prior to projecting the dynamic fringe pattern. As shown in FIG. 4, the step of segmenting 200 can comprise step 210 of inputting the captured image of an unpainted PWBA, step 220 of smoothening the PWBA image using the Gaussian filter, step 230 of generating the edges around each smoothened feature with edges using the Canny algorithm, step 240 of segmenting the regions in the edged image with labels using the region-growing algorithm, and step 250 of detecting the chip package and PWB regions in the label image using geometric analysis.

In an exemplary embodiment, an automated segmentation process of the present invention comprises capturing 210 a capture image of the sample S, smoothening 220 the capture image using the Gaussian filter to generate at least two smoothened features, generating 230 edges around the smoothened features using the Canny algorithm to generate an edged image having at least two edged regions, segmenting 240 the edged regions in the edged image with labels using a region-growing algorithm to generate a label image having the first and second regions, and detecting 250 the first and second regions in the label image using geometric analysis.

The present invention utilizes computational power and devices. In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a processor combined with one or more additional hardware components.

Various techniques described herein may be used to perform configurable gestures in a graphical user interface. The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

In some instances, a graphical user interface may be referred to as an object-oriented user interface, an application oriented user interface, a web-based user interface, a touch-based user interface, or a virtual keyboard. A presence-sensitive input device as discussed herein, may be a device that accepts input by the proximity of a finger, a stylus, or an object near the device. Additionally, a presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

According to one example implementation, the terms computing device or mobile computing device, as used herein, may be a CPU, or conceptualized as a CPU (for example, the CPU 302 of FIG. 15). In certain example implementations, the computing device (CPU) may be coupled, connected, and/or in communication with one or more peripheral devices, such as display, navigation system, stereo, entertainment center, Wi-Fi access point, etc. In another example implementation, the term computing device or mobile computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the mobile computing device may output content to its local display and/or speaker(s). In another example implementation, the mobile computing device may output content to an external display device (e.g., over Wi-Fi) such as a TV or an external computing system.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Figure 2:
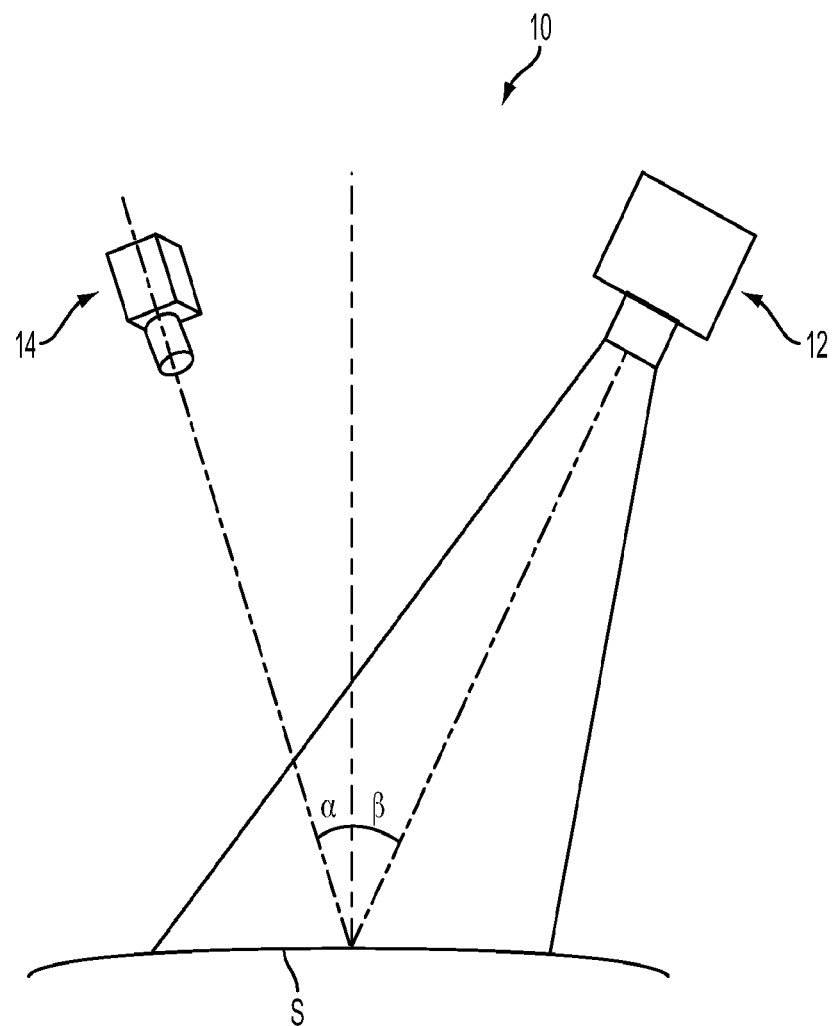
FIG. 2 is a schematic of a setup of the present DFP system according to an exemplary embodiment.
Figure 3:
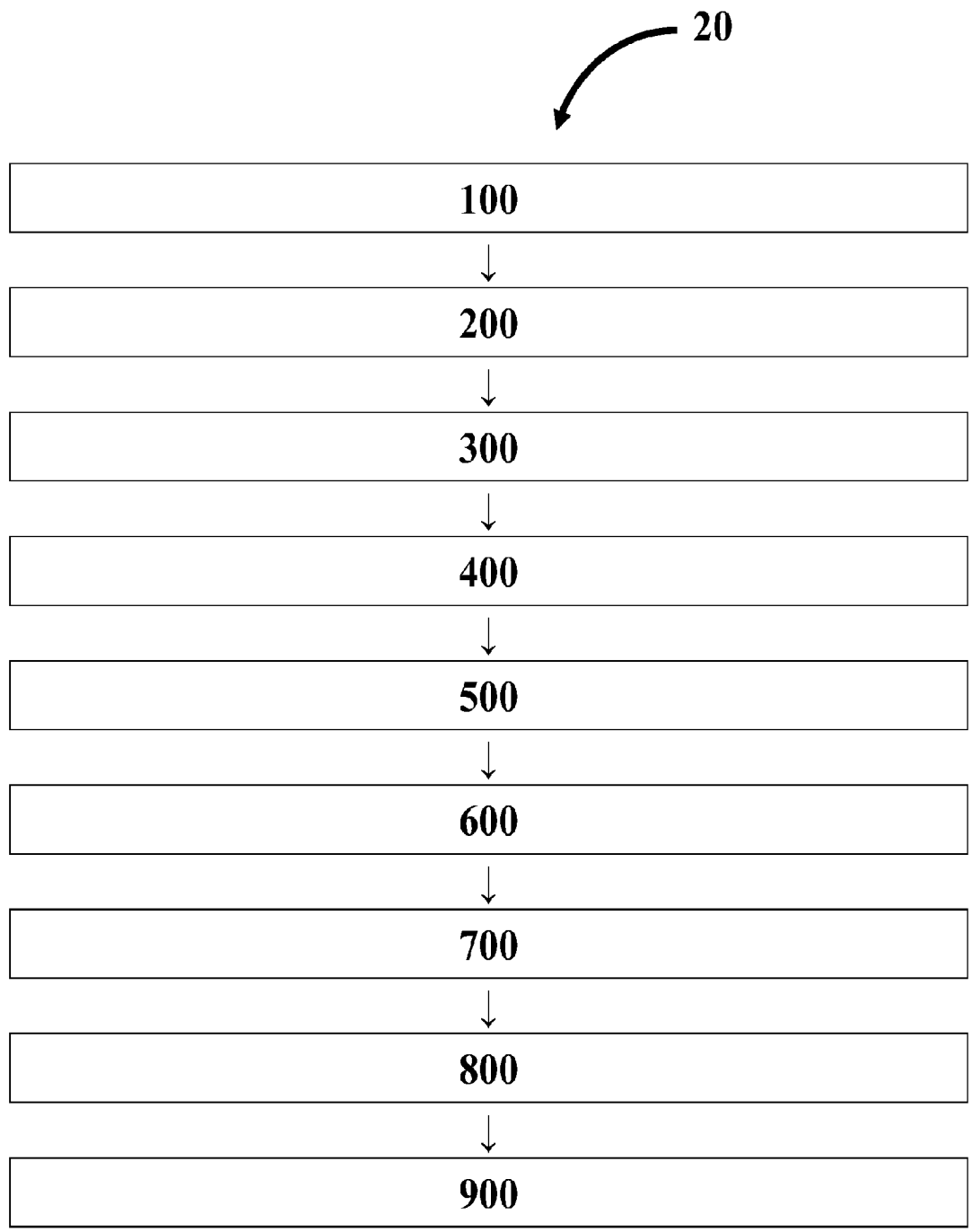
FIG. 3 is a flow diagram of implementation of the present DDFP Technique for measuring the warpage of unpainted PWBA according to an exemplary embodiment.

Dynamic Digital Fringe Projection Technique for Measuring the Warpage of Unpainted Chip Packages and Boards System Setup A DFP system that implements the present DDFP technique was developed. An exemplary setup of the DFP system is illustrated in FIG. 2. A fringe pattern is generated by a computer and projected through a digital projector onto the sample surface. The image of the projected fringe pattern is captured by a CCD camera with a 60×45 mm field of view.

The phase shifting method is used to generate a wrapped phase image from the captured fringe pattern images and the mask-cut algorithm is used to unwrapped the wrapped phase image. The theoretical out-of-plane resolution of the DFP system can be calculated using equation (1). The values of P, α, and β of the DFP system used in this study are 0.6 mm, 10°, and 36° respectively. The value of C is 256 because 8-bit data are used to represent one pixel. The theoretical resolution of the DFP system is 2.6 μm.

$$R = \frac{P}{C(\tan\alpha + \tan\beta)} \quad (1)$$

where:
R=resolution, P=fringe pitch, α=observation angle, β=illumination (or projection) angle, and C=coefficient of resolving power for gray level of light intensity.

Figure 5A:
FIG. 5 are micrographs of (a) a projected dark and uniform intensity fringe pattern, (b) a PWBA fringe image illuminated by (a), (c) a bright and uniform intensity fringe pattern, (d) a PWBA fringe image illuminated by (c), (e) a non-uniform intensity fringe pattern, and (f) a PWBA fringe image illuminated by (e)
Figure 5B:
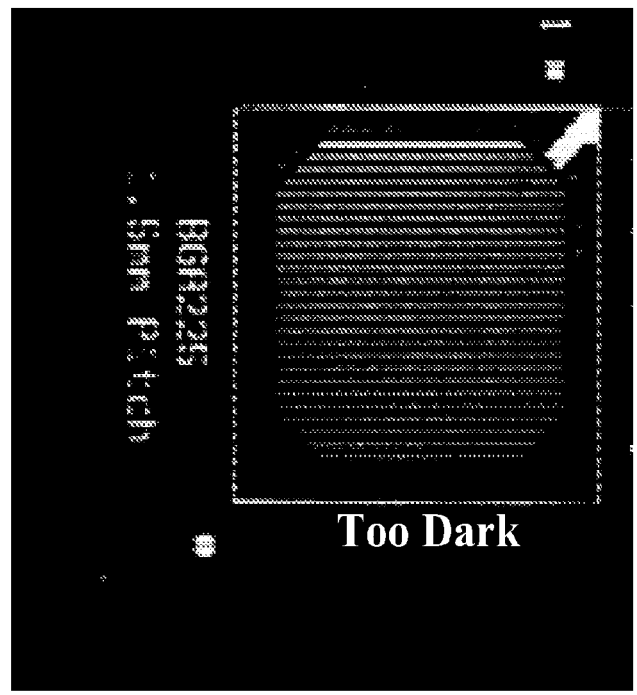
Figure 5C:
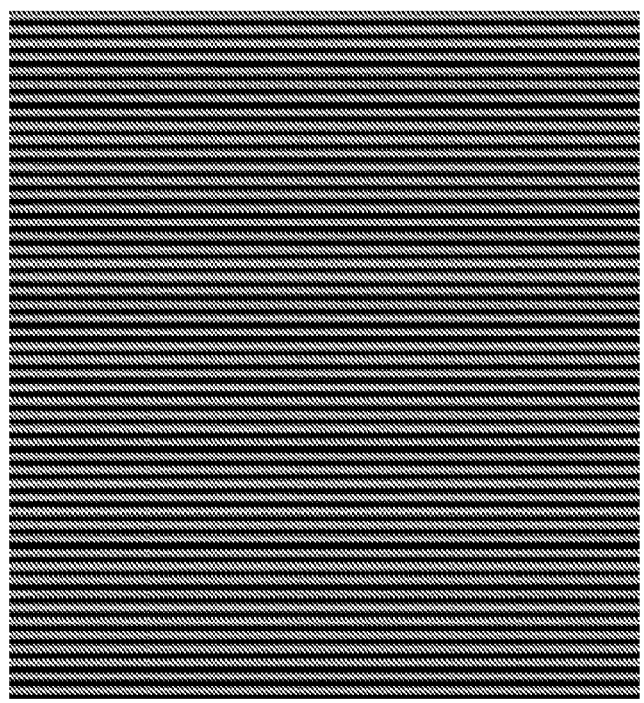
Figure 5D:
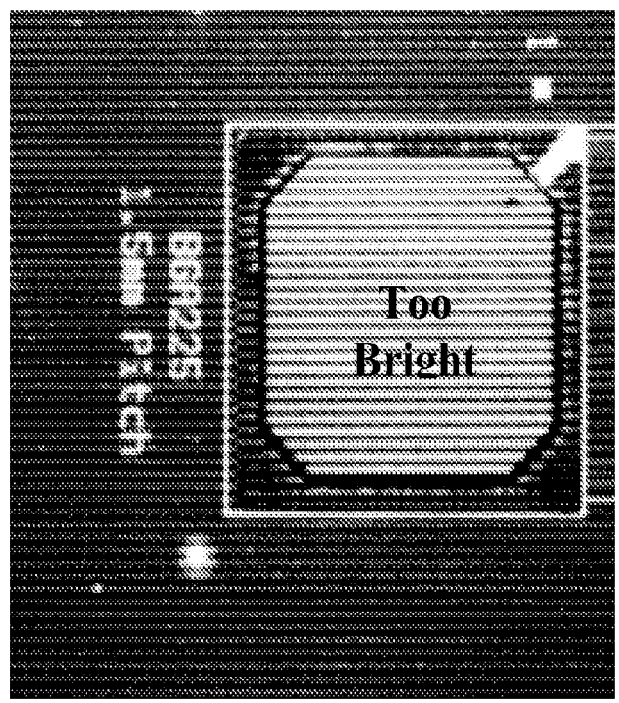
Figure 5E:
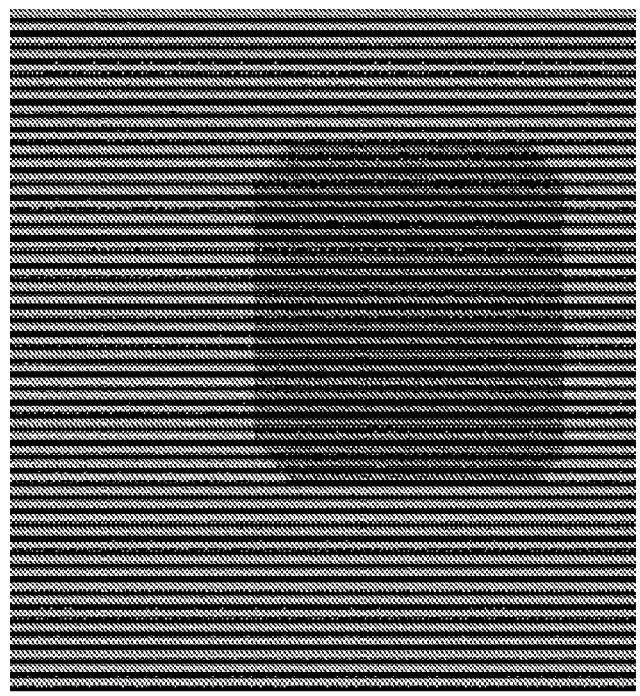
Figure 5F:
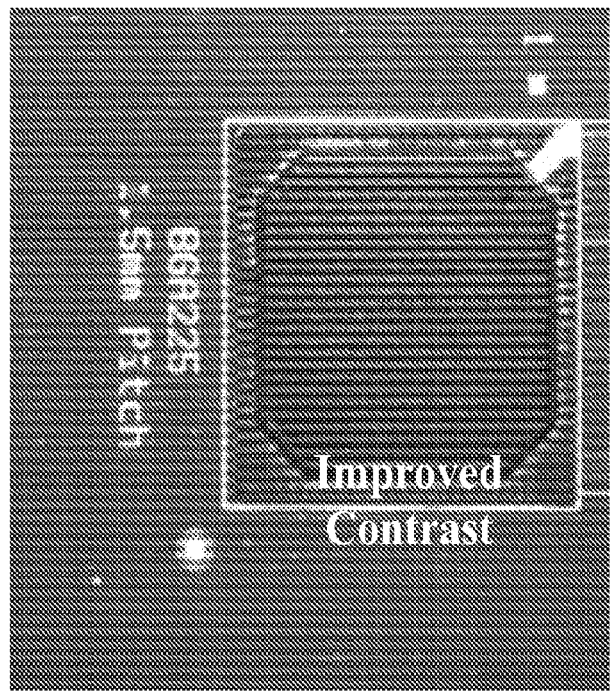

Dynamic Digital Fringe Projection Technique for Measuring the Warpage of Unpainted Chip Packages and Boards When measuring an unpainted PWBA using the DFP technique, various surface reflectances of the chip packages and the PWB generally causes too dark or too bright regions in the PWBA fringe images. For example, when a dark fringe pattern (FIG. 5(a)) is projected onto the PWBA, the PWB region of the PWBA fringe image (FIG. 5(b)) is too dark for processing. On the other hand, when a bright and uniform fringe pattern (FIG. 5(c)) is projected onto the PWBA, the package region of the PWBA fringe image (FIG. 5(d)) is too bright for processing. This problem can be solved by projecting a fringe pattern that contains different intensities for the chip package and the PWB, as shown in FIG. 5(e), in order to obtain a fringe pattern image with improved fringe contrast as shown in FIG. 5(f).

This work developed the present dynamic digital fringe projection (DDFP) technique that generates and projects a dynamic fringe pattern, in which a proper fringe intensity distribution is dynamically determined based on the coordinates and surface reflectance of chip package(s) and/or PWB. The present DDFP technique includes development of an automatic segmentation method to segment the chip package and PWB regions in an unpainted PWBA image and to mask out surface patterns such as the copper patterns and traces, and inscriptions. It also includes the calibrations of intensities and coordinates between the projected and captured images. Because the coordinate calibration is independent to sample changes, it can be performed once when a system is setup. A flowchart to implement the present DDFP technique is presented in FIG. 3.

Segmentation of Chip Package and PWB Regions in Unpainted PWBA Images

Current automatic chip package segmentation methods cannot be used for an unpainted PWBA image because of the various patterns such as copper patterns and traces and inscriptions in an unpainted PWBA image. An inventive segmentation method was developed to segment chip package and PWB regions in an unpainted board image.

The steps of the segmentation method are as following: (a) Captures an unpainted board; (b) Smoothens the board image using the Gaussian filter; (c) Segments each smoothened feature with edges using the Canny algorithm; (d) Segments regions in edge image using the region-growing algorithm. In this step, the board surface patterns such as the copper patterns and traces, and inscriptions are masked out because they can cause measurement error; and (e) Detects the chip package and PWB regions in the segmented region image using geometric analysis. Sample images obtained at each step are shown in FIG. 6.

To segment the PBGA package and PWB regions in unpainted PWBA images, a region growing method (RGM) that uses of the Canny and region-growing algorithms is developed. FIG. 4 presents the steps of the RGM.

Step 220: Smoothen the PWBA Image Using the Gaussian Filter

Figure 6A:
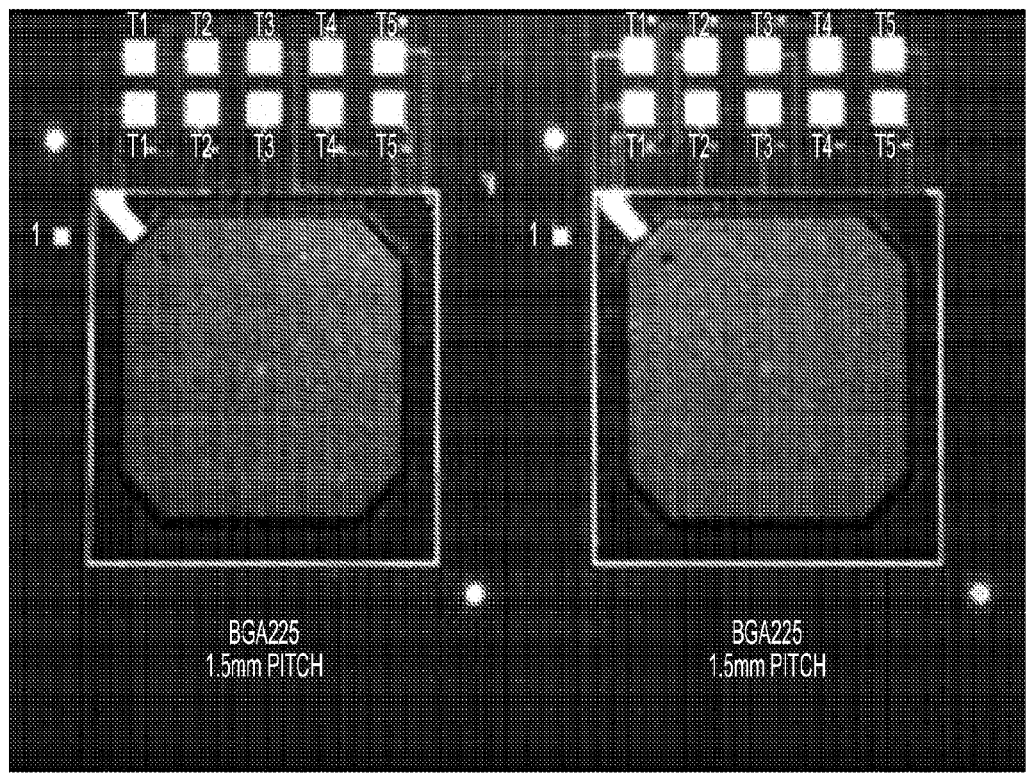
FIG. 6 are micrographs of unpainted PWBA images (a) before and (b) after convolving the Gaussian kernel, (c) smoothened PWBA image and (d) edged PWBA image obtained after the Canny algorithm is applied to (c), (e) edged PWBA image and (f) label obtained after the region-growing algorithm is applied to (e), (g) label image of the PWBA and (h) detected PBGA package and PWB regions after the geometric analysis is applied to (g)
Figure 6B:
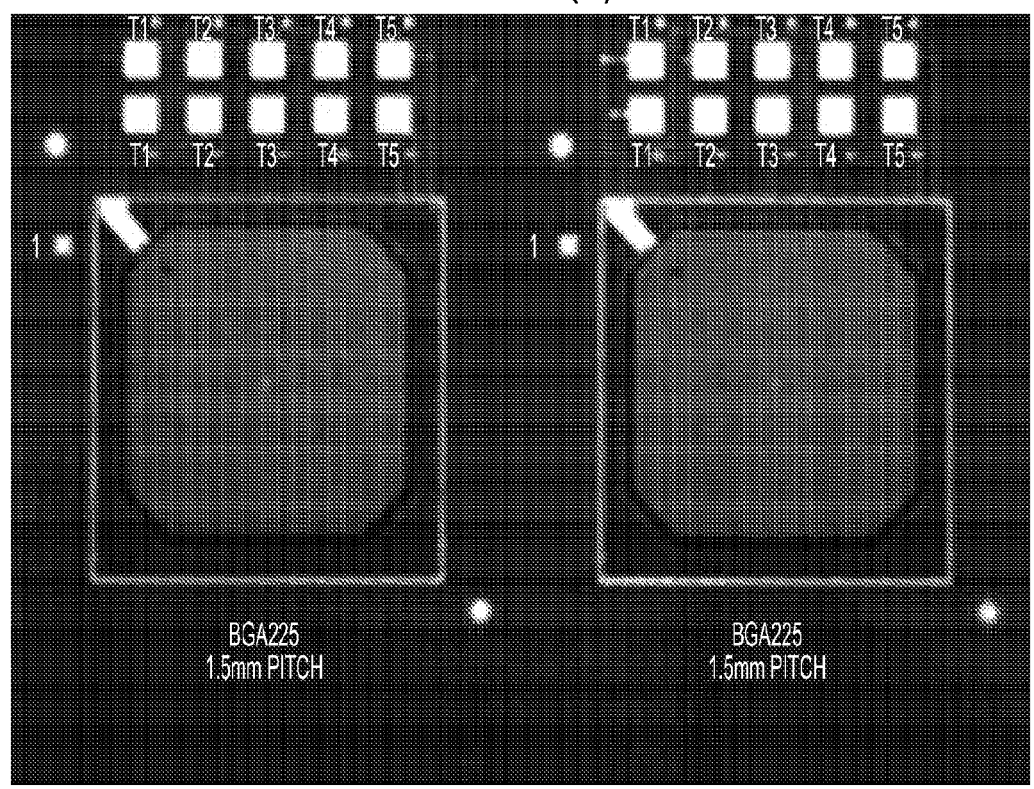

Before applying the Canny algorithm, which is susceptible to noise present in raw image data, the unpainted PWBA image is smoothened by calculating the weighted average intensity using a 2D Gaussian function. Since the image is stored as a collection of discrete pixels, a Gaussian kernel, a discrete approximation of the Gaussian function, is convolved on the image to smoothen it. In this study, a 5×5 Gaussian kernel shown in Table 1 is used, and sample images before and after convolving the Gaussian kernel on an unpainted PWBA image are shown in FIGS. 6(a) and 6(b).

TABLE 1

The 5 × 5 Gaussian kernel $$G_{5\times5} = \frac{1}{159}\begin{bmatrix} 2 & 4 & 5 & 4 & 2 \\ 4 & 9 & 12 & 9 & 4 \\ 5 & 12 & 15 & 12 & 5 \\ 4 & 9 & 12 & 9 & 4 \\ 2 & 4 & 5 & 4 & 3 \end{bmatrix}$$

Figure 6C:
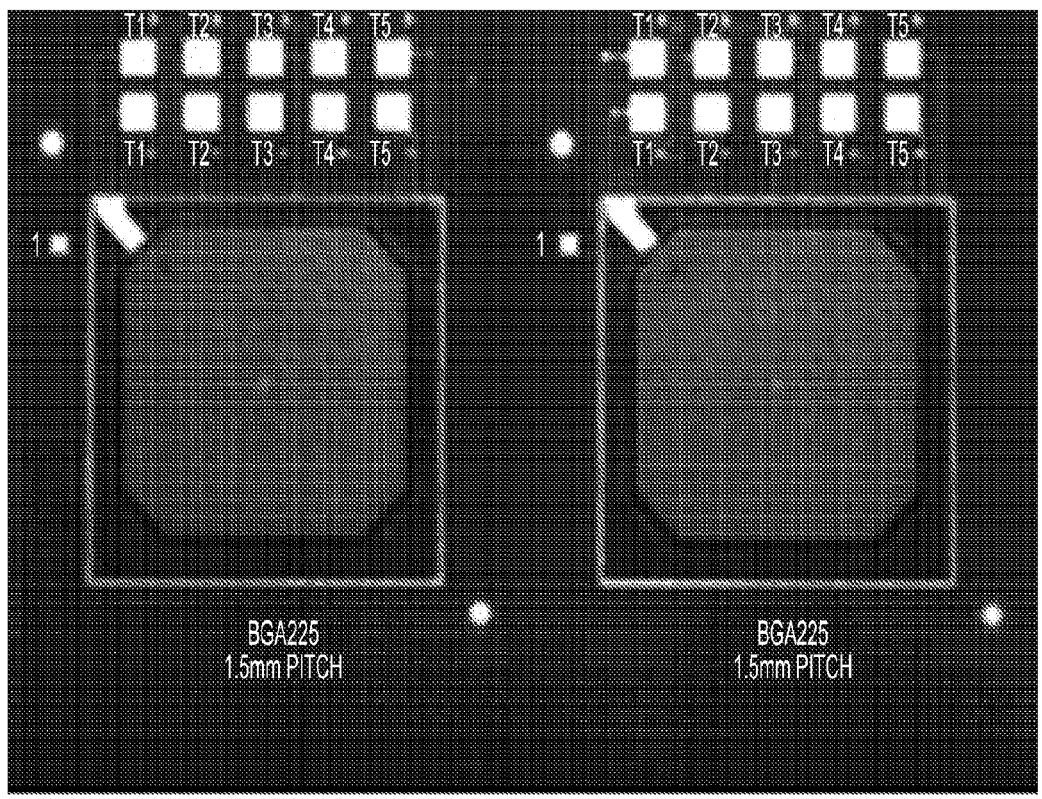
Figure 6D:
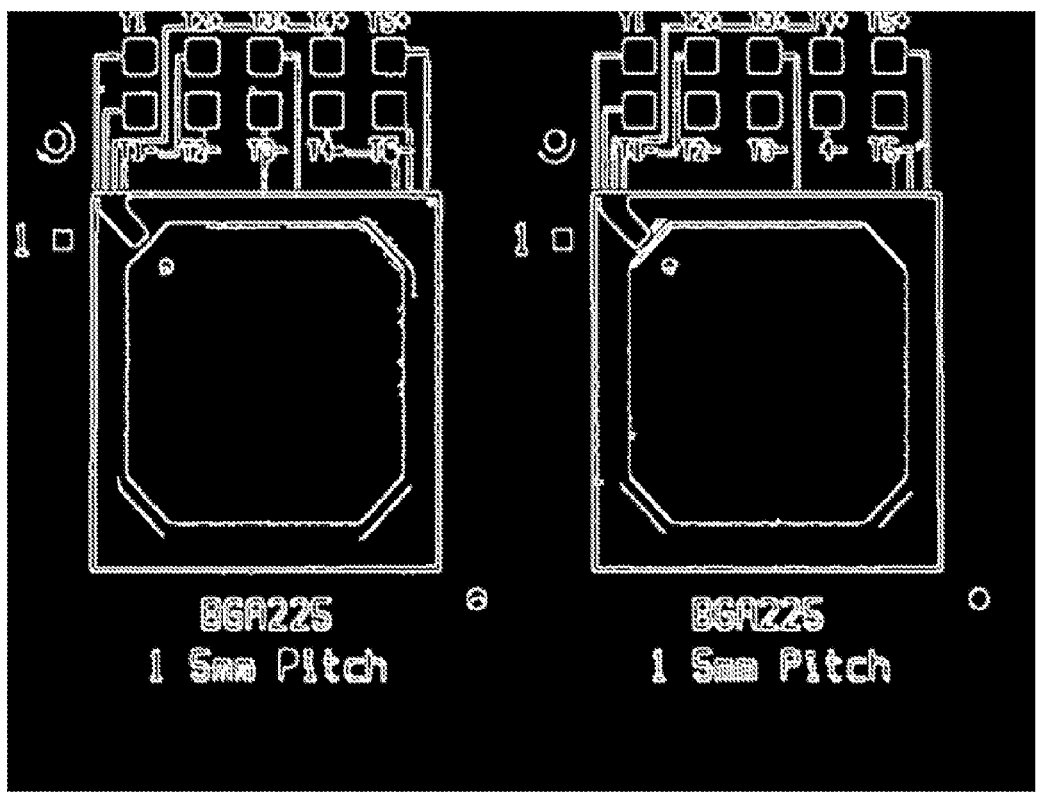

Step 230: Generate the Edges Around Each Smoothened Feature Using the Canny Algorithm The Canny algorithm is the most widely used algorithm for detecting edges in an image. To generate the edges around each smoothened feature, the Canny algorithm is applied to the smoothened PWBA image. FIGS. 6(c) and 6(d) show the smoothened PWBA image and the edged PWBA image obtained after the Canny algorithm is applied to the smoothened PWBA image.

Figure 6E:
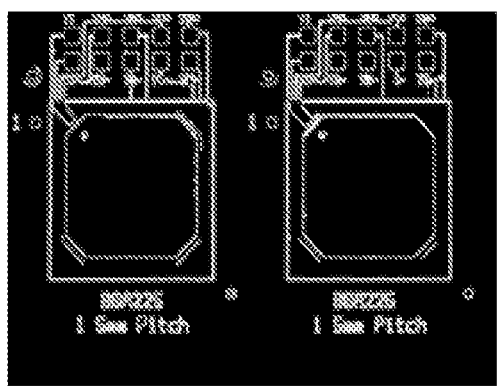
Figure 6F:
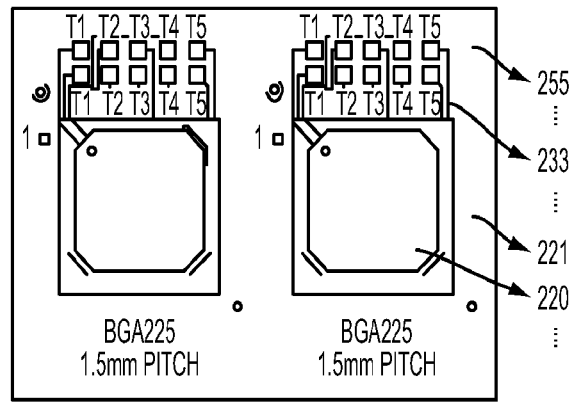

Step 240: Segment the Regions in the Edged Image with Labels Using the Region-Growing Algorithm The region-growing algorithm is a process of joining adjacent pixels of similar intensities in regions, a widely used process for region-based image segmentation. The region-growing algorithm is applied to the edged PWBA image in order to label each region in the edged PWBA image. FIGS. 6(e) and 6(f) show the edged PWBA image and the label image of the PWBA obtained after the region-growing algorithm is applied to the edged PWBA image. In the label image, different gray values are assigned for each region, as depicted on the figure.

Figure 6G:
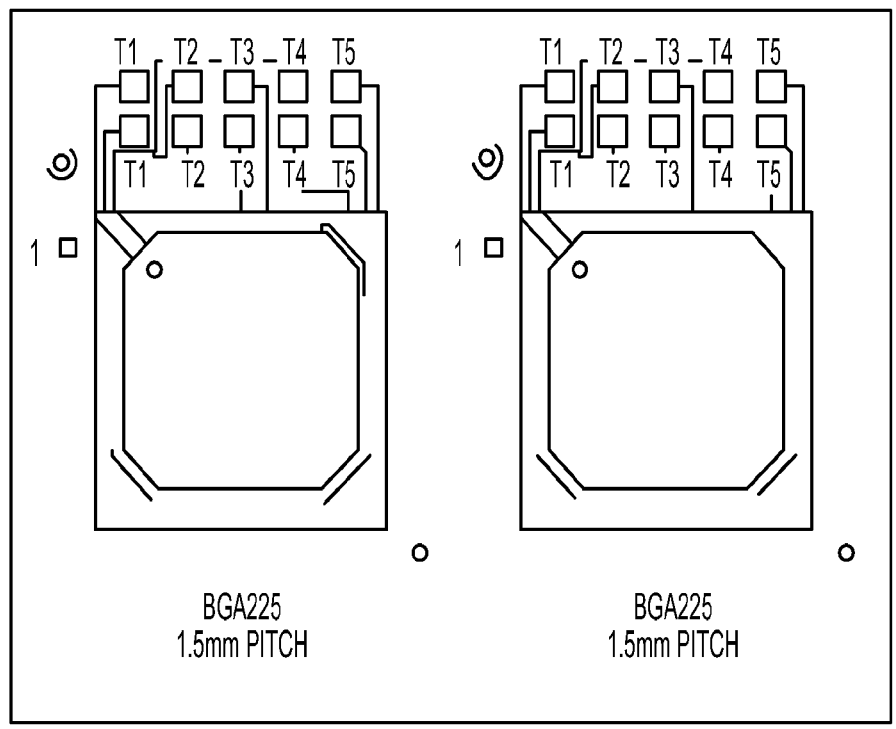
Figure 6H:
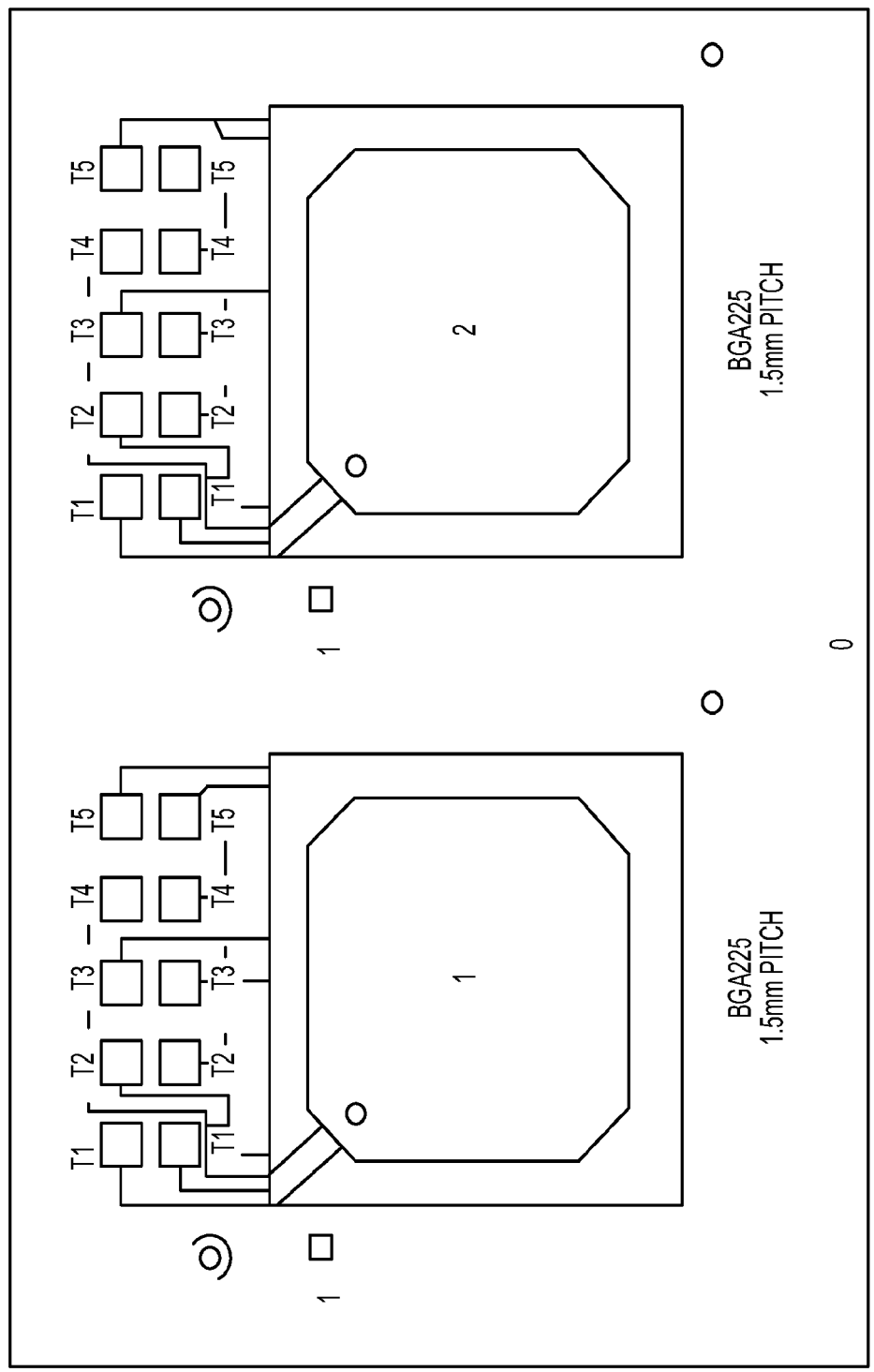

Step 250: Detect the PBGA Package and PWB Regions in the Label Image Using Geometric Analysis To detect the PBGA package and PWB regions among the regions segmented in step 240, a geometric analysis is performed. By the geometric analysis, the largest region is recognized as the PWB region. Any region larger than 14×14 mm that does not encompass another region larger than 14×14 mm is recognized as the PBGA package region. Here, it is assumed that PBGA packages are larger than 14×14 mm because the minimum size of commercially available PBGA packages is 15×15 mm. FIGS. 6(g) and 6(h) depict the results of detecting the PBGA package and PWB regions from the label image using the geometric analysis.

The PWB region is marked with "0," the PBGA package regions are marked with "1" and "2," and the surface patterns and substrate regions are masked-out (in black).

Coordinate Calibration Between Projected and Captured Images

Figure 7A:
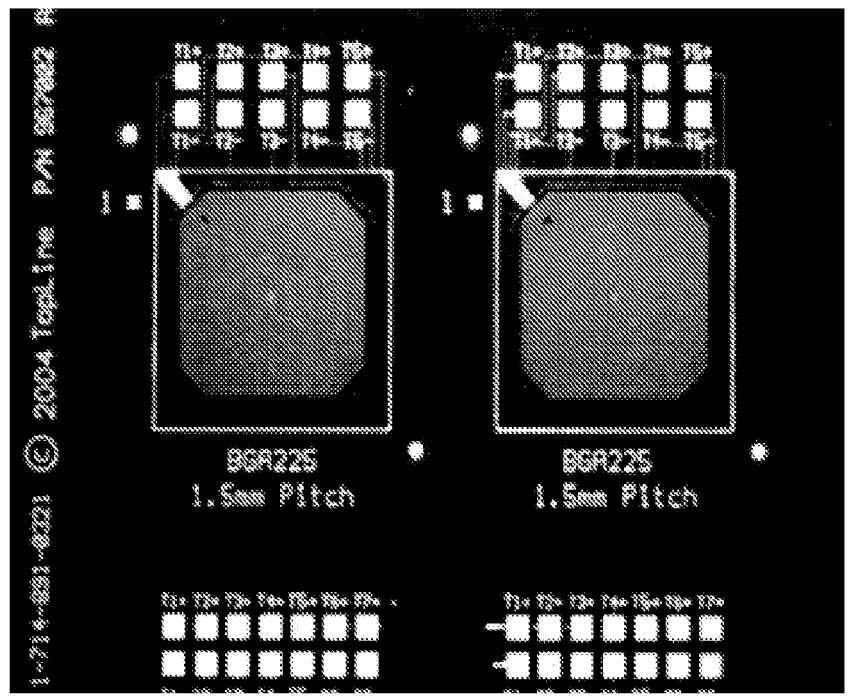
FIG. 7 are micrographs of (a) a PWBA image, (b) a dynamic fringe pattern generated based on the chip package coordinates in (a), and (c) the PWBA fringe image illuminated by (b)
Figure 7B:
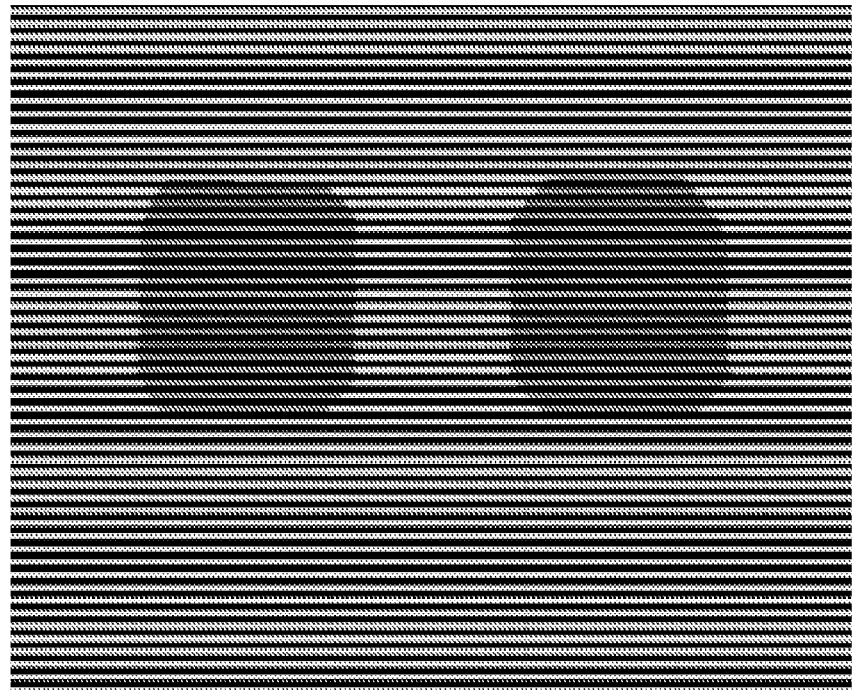
Figure 7C:
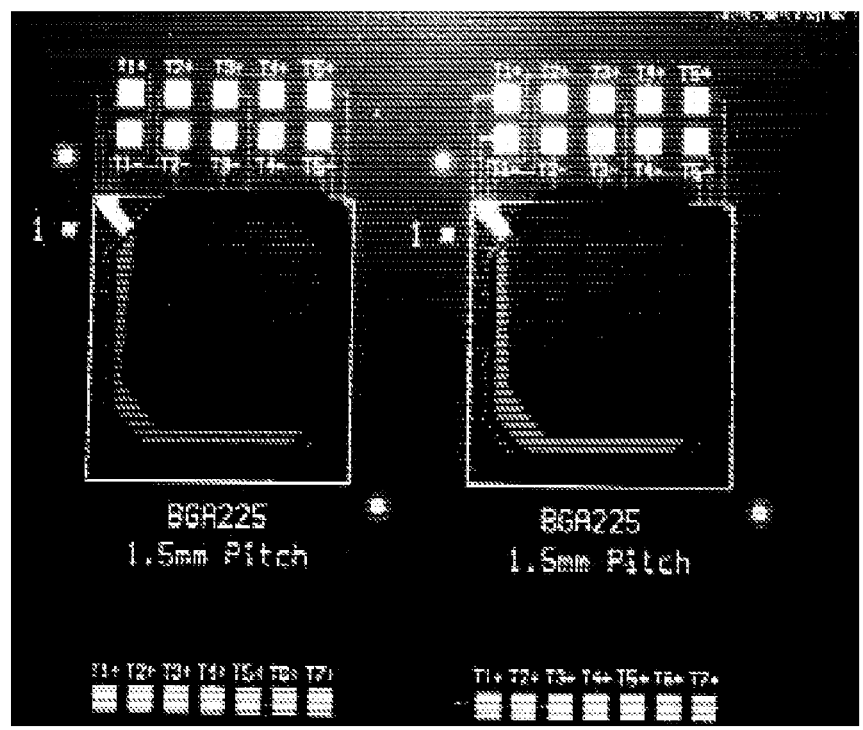

Coordinates in the projected and captured images are different because the field of views of the projector and the camera do not match. This causes misalignment of a projected dynamic fringe pattern as shown in FIG. 7(c).

Figure 8A:
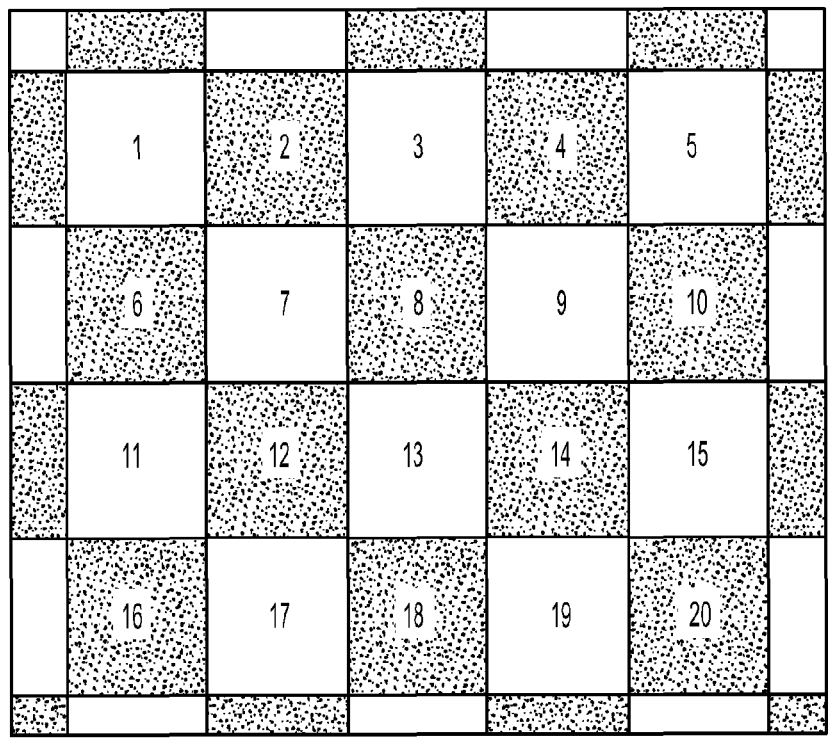
FIG. 8 are square divisions in the (a) projected and (b) captured images when 5×4 checker pattern is used.
Figure 8B:
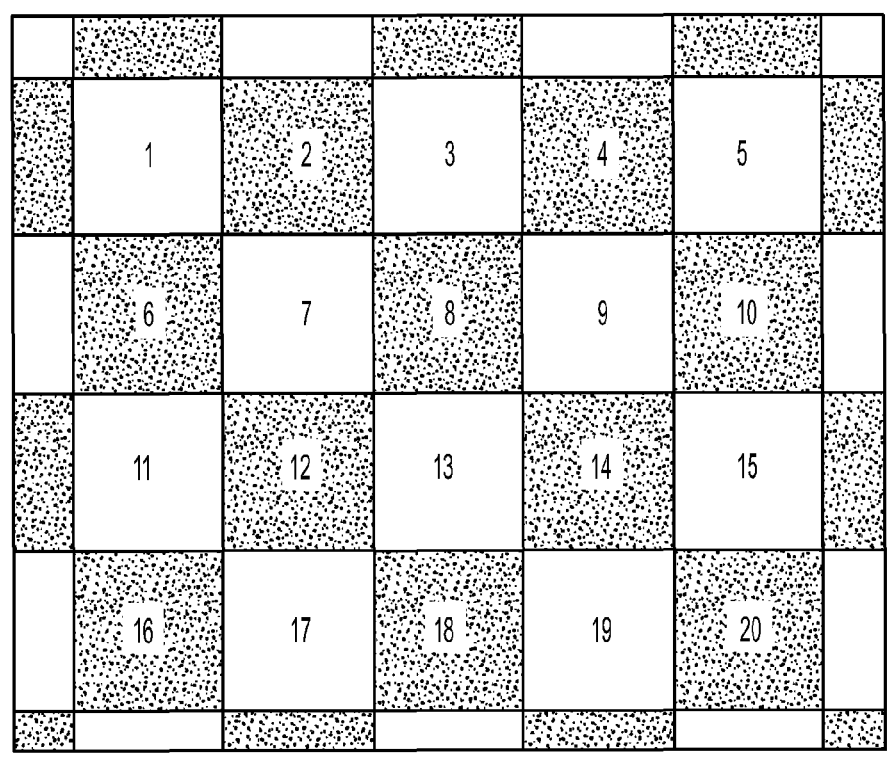

To calibrate the coordinate mismatches, coordinate transfer functions (CTFs) between the projected and captured images are obtained by using the checker pattern and the projector-camera homography. A checker pattern that has n×m squares is generated, projected, and captured. The checker pattern divides the projected and captured images by n×m divisions as shown in FIG. 8. The CTFs for ith division can be given by equation (2). In equation (2), $T_{i,j}$ can be calculated by the eigenvector corresponding to the smallest eigenvalue of $A^T A$, where A is given in equation (3).

$$X_i(x_i, y_i) = \frac{T_{i1}x_i + T_{i2}y_i + T_{i3}}{T_{i7}x_i + T_{i8}y_i + T_{i9}} \quad (2)$$

$$Y_i(x_i, y_i) = \frac{T_{i4}x_i + T_{i5}y_i + T_{i6}}{T_{i7}x_i + T_{i8}y_i + T_{i9}}$$

where:
$(X_i, Y_i)$=coordinates in ith division of captured image, $(x_i, y_i)$=coordinates in ith division of projected image, $T_{i,j}$=transformation coefficients for ith division.

$$A = \begin{pmatrix} x_{i1} & y_{i1} & 1 & 0 & 0 & 0 & -X_{i1}x_{i1} & -Y_{i1}x_{i1} & -X_{i1} \\ 0 & 0 & 0 & x_{i1} & y_{i1} & 1 & -X_{i1}y_{i1} & -Y_{i1}y_{i1} & -Y_{i1} \\ \vdots & \vdots & \vdots & \vdots & \vdots & \vdots & \vdots & \vdots \\ x_{i4} & y_{i4} & 1 & 0 & 0 & 0 & -X_{i4}x_{i4} & -Y_{i4}y_{i4} & -X_{i4} \\ 0 & 0 & 0 & x_4 & y_4 & 1 & -X_{i4}y_{i4} & -Y_{i4}y_{i4} & -Y_{i4} \end{pmatrix} \quad (3)$$

where:
$(X_{i1}, Y_{i1}) \sim (X_{i4}, Y_{i4})$=four corner coordinates ith division in captured image, $(x_{i1}, y_{i1}) \sim (x_{i4}, y_{i4})$=four corner coordinates of ith division in projected image.

Figure 9A:
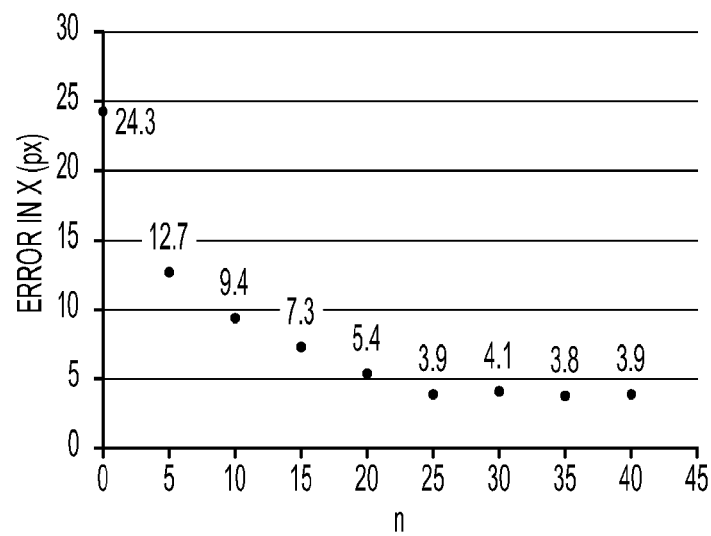
FIGS. 9(a), (b) are graphs of coordinate transfer errors when n of the checker pattern increases.
Figure 9B:
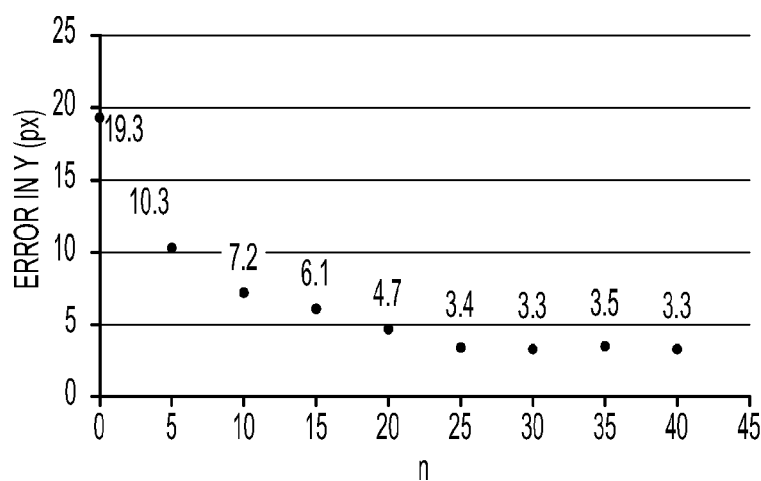

Coordinate transfer error is quantified by the average differences of the coordinates of 32 cross marks between the projected and captured images. Because the coordinate transfer error can be affected by the checker size (n×m), the coordinate transfer errors for various checker size are compared as shown in FIG. 9. The results show that the coordinate transfer error decreases when n increases until 25. Based on the results, a 25×18 checker pattern is used for the coordinate calibration.

Intensity Calibration Between Projected and Captured Images

Figure 10:
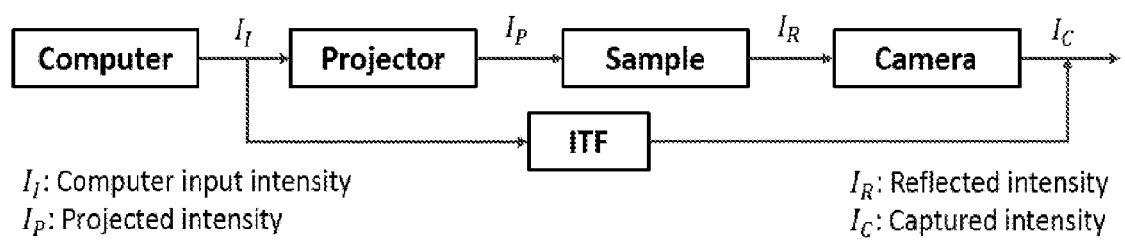
FIG. 10 is a schematic of the intensity flow in the DFP system according to an exemplary embodiment of the present invention.
Figure 11A:
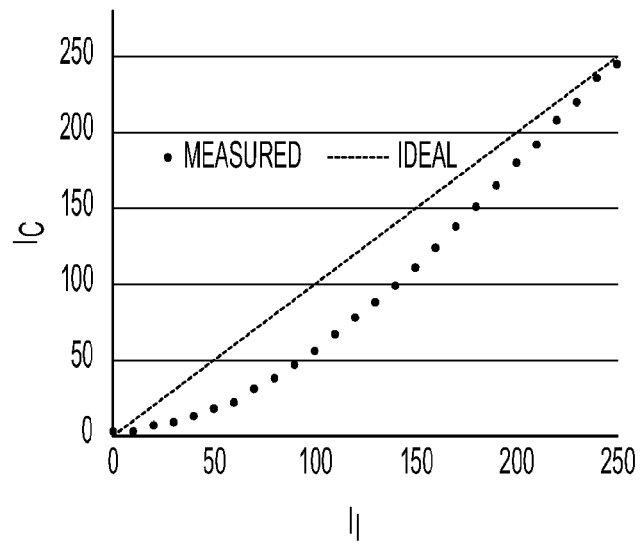
FIGS. 11(a), (b) are graphs showing the relationship between $I_I$ and $I_C$ when the samples are (a) a PWB and (b) a plastic ball grid array (PBGA)
Figure 11B:
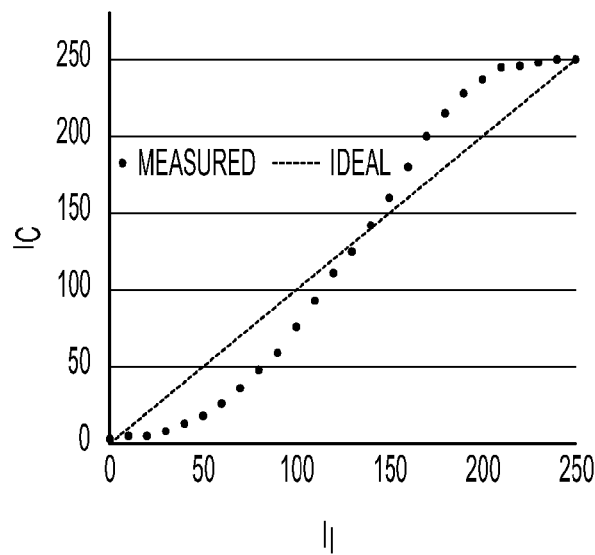

FIG. 10 shows intensity flow in the DFP system. The intensity transfer function (ITF) represents the relationship between $I_I$ (input) and $I_C$ (output), which is generally nonlinear mainly because of the gamma nonlinearity of the digital projector and the various reflection characteristics of the sample surfaces. FIG. 11(a) and FIG. 11(b) show examples of the nonlinearity when the samples are a PWB and a PBGA, respectively.

Figure 12A:
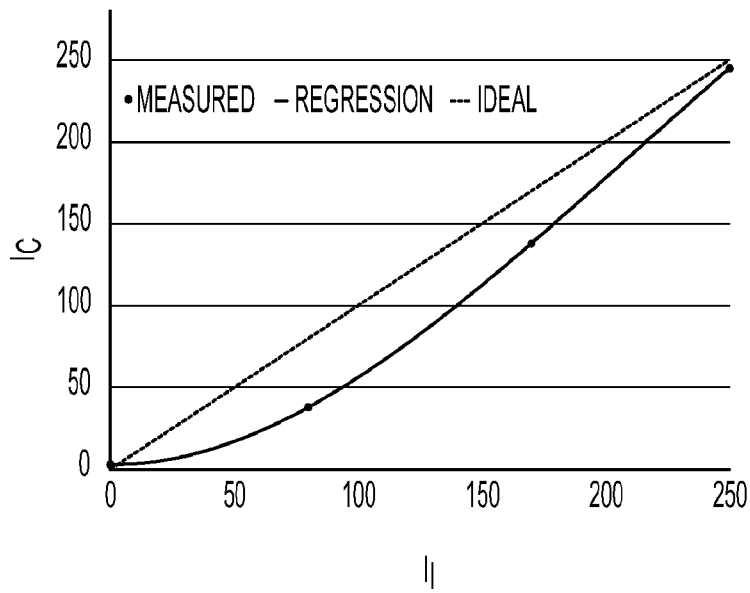
FIGS. 12(a), (b) are graphs of ITFs (third order polynomial equations) obtained by regressing four measured intensities when the samples are (a) a PWB and (b) a PBGA.
Figure 12B:
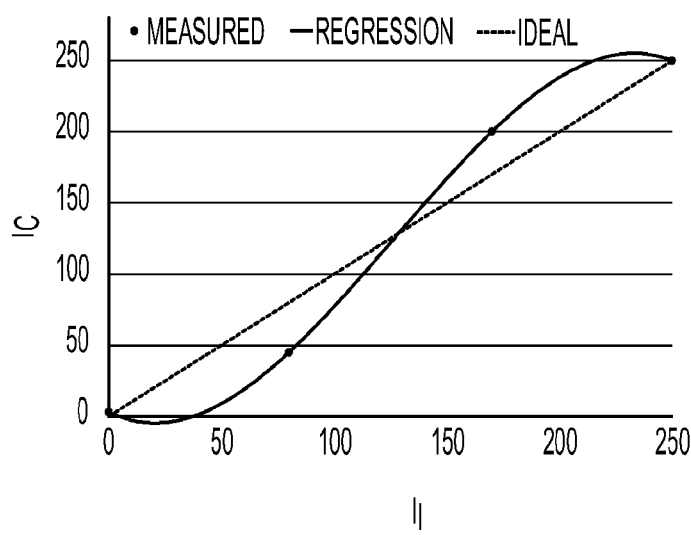

To calibrate the nonlinearity, the lookup table method can be used. It stores experimentally measured $I_C$ and corresponding $I_I$ in a lookup table so that an input intensity can be modified using the lookup table to compensate the nonlinearity. However, because a different lookup table should be experimentally determined for a different sample surface, it is time-consuming for measuring unpainted chip packages and boards. The polynomial regression method can overcome this disadvantage by obtaining a third order polynomial regression equations between $I_I$ and $I_C$ for a sample surface and use it as the ITF of the sample surface. FIG. 12(a) and FIG. 12(b) show examples of the ITF when the samples are a PWB and a PBGA, respectively.

Figure 13A:
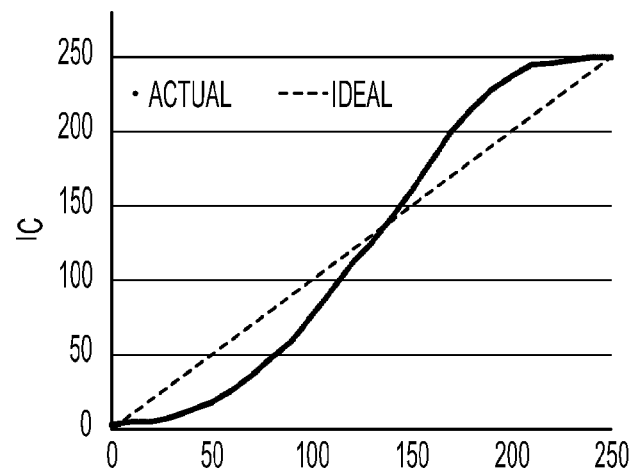
FIGS. 13(a), (b) are graphs of the relationship between $I_I$ and $I_C$ (a) before and (b) after the intensity calibration according to an exemplary embodiment of the present invention.
Figure 13B:
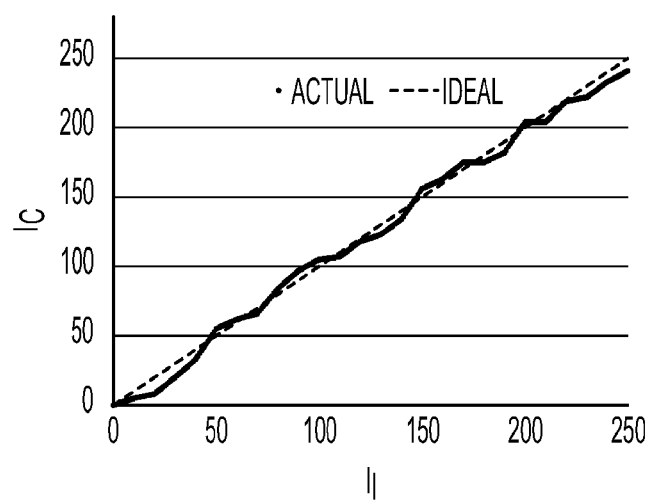

After an ITF is obtained, a lookup table of the sample surface can be determined using the ITF instead of full experiments. Thus, the DDFP technique employs the polynomial regression method for the intensity calibration. As shown in FIG. 13, the nonlinearity is significantly reduced after the intensity calibration using the polynomial regression method.

Preliminary Experimental Results

Figure 14A:
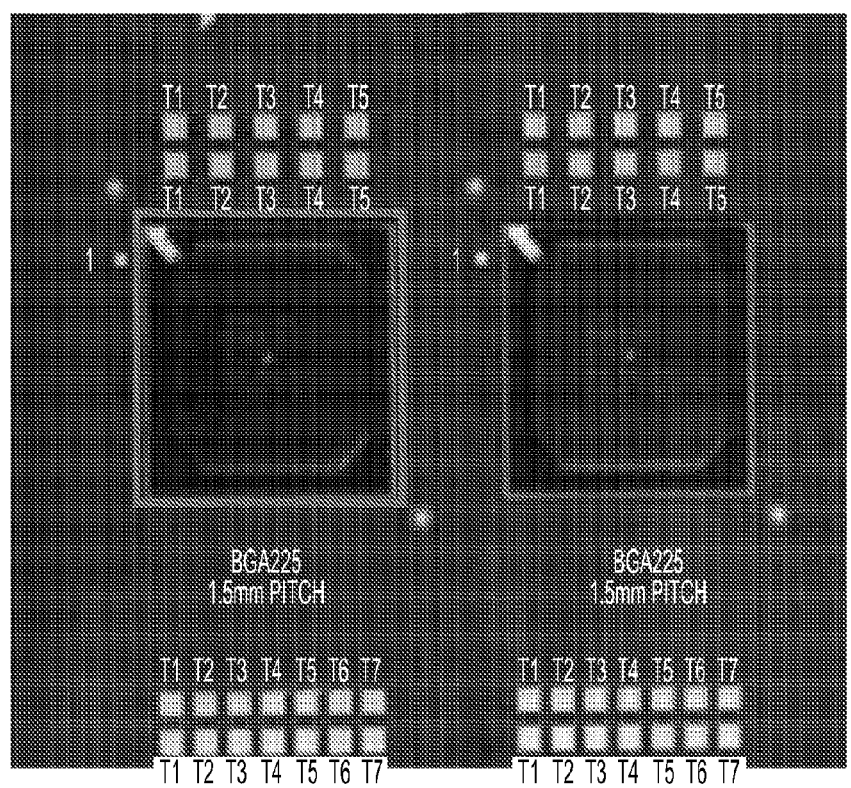
FIG. 14 are micrographs of (a) Sample 1—PBGA1, (b) Sample 1—PBGA 2, (c) Sample 1—PWB (the measured PWB region), (d) Sample 2, (e) Sample 3, and ((f)-(j)) the warpage images of ((a)-(e)), respectively, according to an exemplary embodiment of the present invention.
Figure 14B:
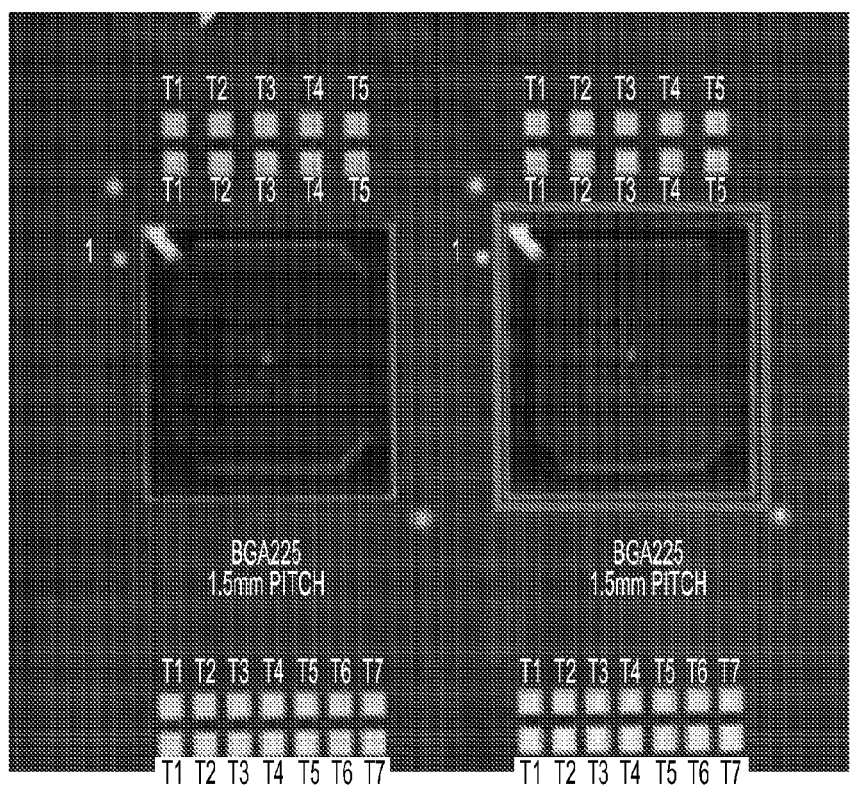
Figure 14C:
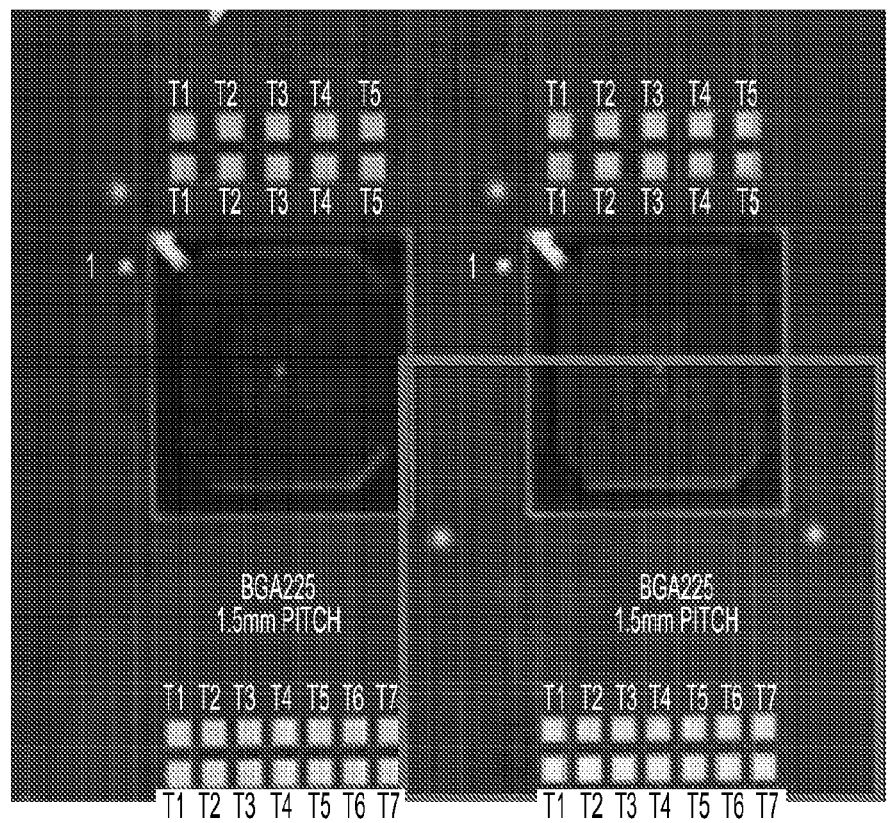
Figure 14D:
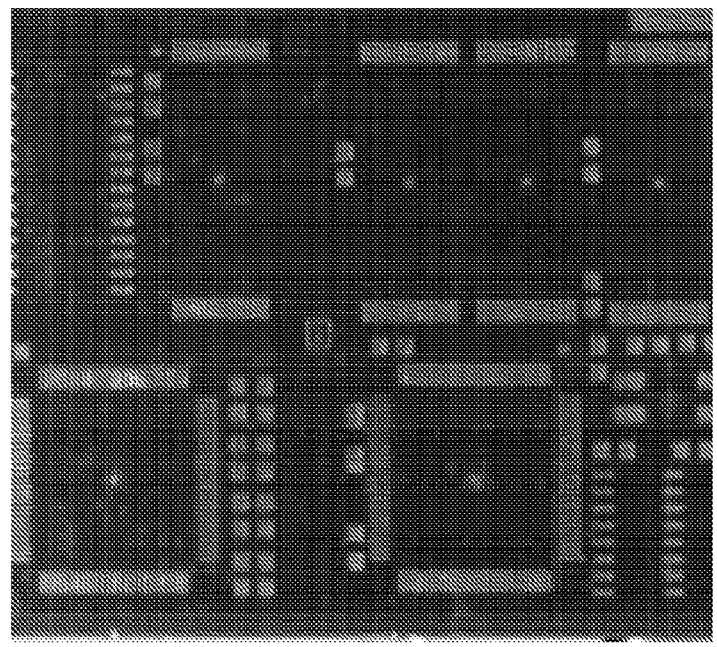
Figure 14E:
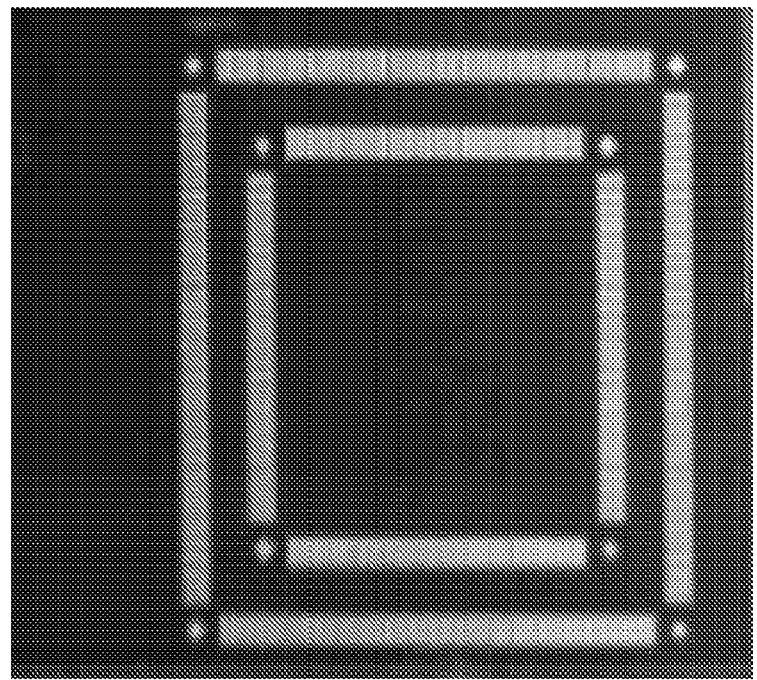
Figure 14F:
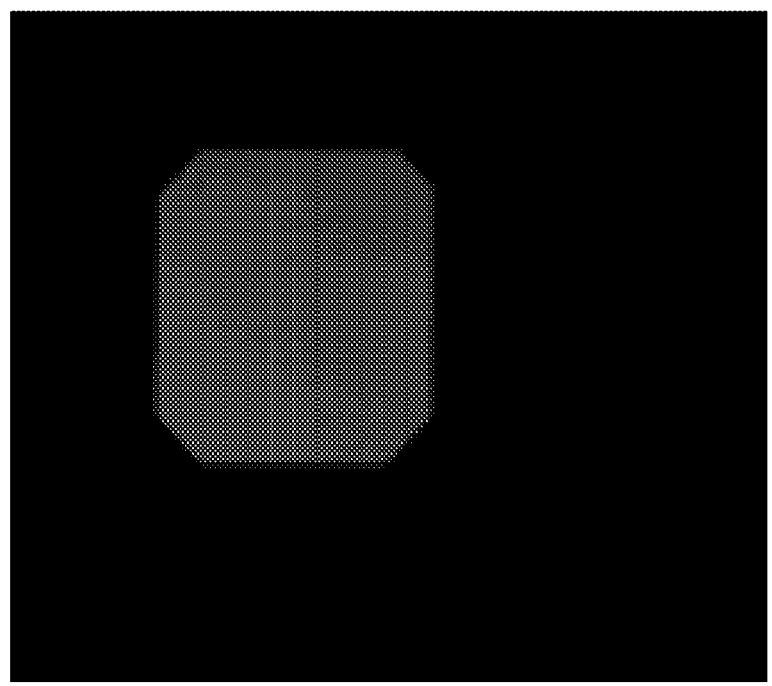
Figure 14G:
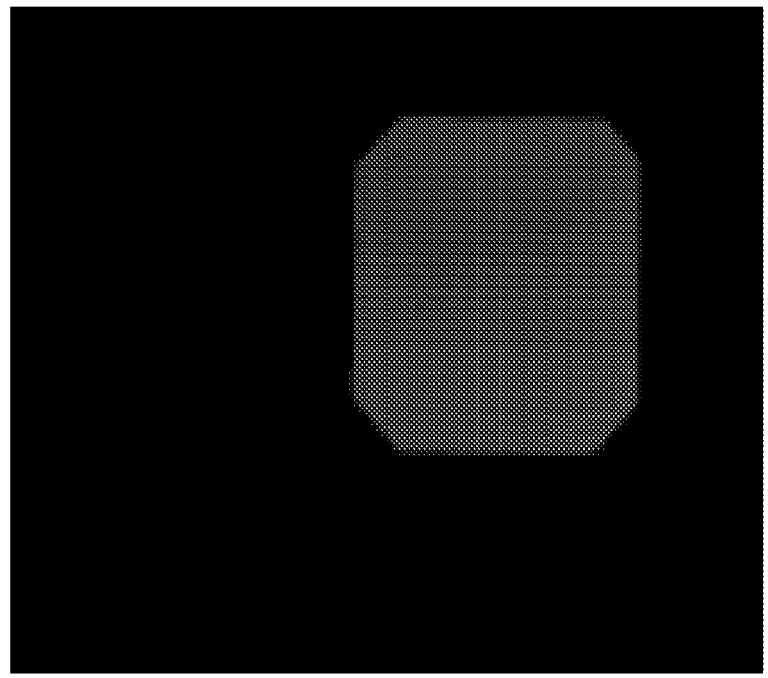
Figure 14H:
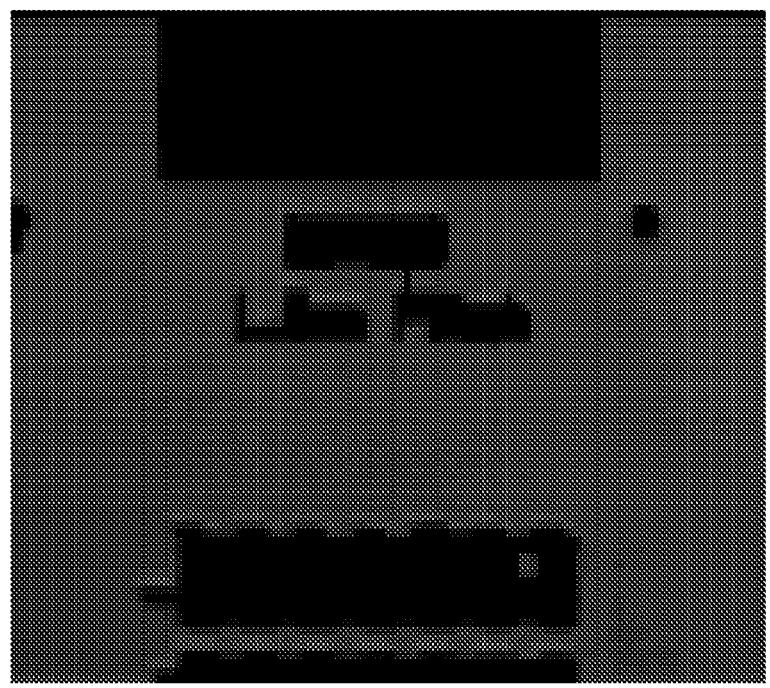
Figure 14I:
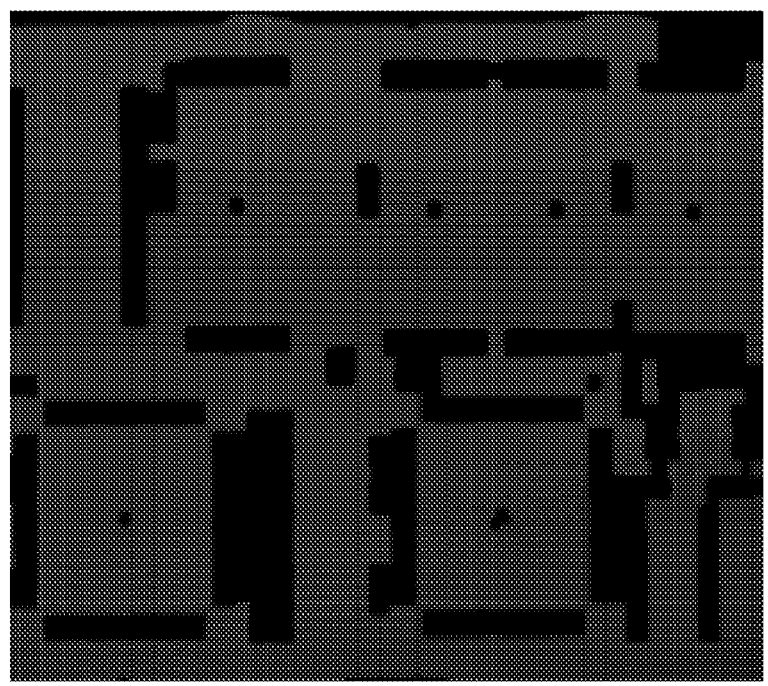
Figure 14J:
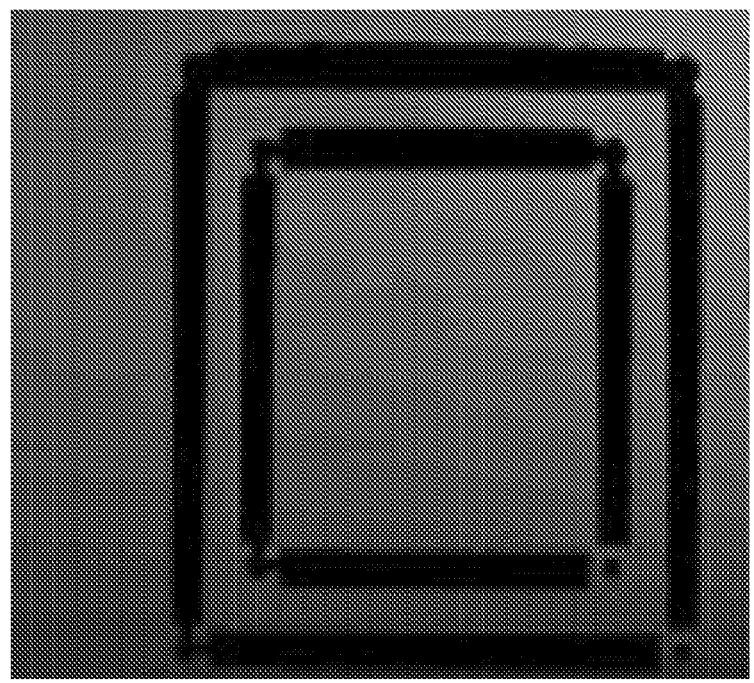

Three samples were measured using the DDFP technique. Sample 1 is a PWBA containing two PBGA packages, sample 2 is a thin PWB, and sample 3 is a PWB, shown in FIG. 14. The measured PBGA1, PBGA2, and PWB region of the sample 1 is marked with red rectangles in FIGS. 14(a), (b), and (c), respectively. The measurement results are compared with those of a contact profilometer (Tencor P-15), as summarized in Table 2.

TABLE 2

Comparison of Warpage Measurement Results

| | Max. Warpage (μm) | | |
| --- | --- | --- | --- |
| Sample | Tencor P-15[a] | DDFP[b] | % Error |
| (1) Sample 1 PBGA 1 | 31.95 | 35.52 | 11.17% |
| (2) Sample 1 PBGA 2 | 37.32 | 33.32 | −10.72% |
| (3) Sample 1 PWB | 63.77 | 70.04 | 9.83% |
| (4) Sample 2 PWB | −802.79 | −755.30 | −5.92% |
| (5) Sample 3 PWB | 603.32 | 557.21 | −7.64% |

[a]The Tencor P-15 is a contact profilometer with a resolution of less than 1 μm.
[b]The DDFP values are the averages of ten measurements.

Expected Contributions and Impact

The DDFP technique is developed for measuring the warpage of unpainted chip packages and boards and is implemented in the DFP system. This is the first method of its kind for measuring the warpage of unpainted chip packages and boards. Because the digital technologies advance rapidly, this new technique has big potential to be used for measuring the warpage of unpainted chip packages and boards accurately and quickly in the assembly line to improve yields and quality of chip packages and boards. Overall, the DDFP technique is expected to improve yields and reliabilities of chip packages, PWBs and PWBAs. This will reduce the manufacturing costs and time to market chip packages, and subsequently reduce the prices of the end products.

Computational Power And Devices

The setup of the DFP system is illustrated in FIG. 2. A fringe pattern is computer generated and projected through a digital projector onto the sample surface. A CCD camera with a 60×45 mm field of view captures the image of the projected fringe pattern. To generate a wrapped phase image from the captured fringe images, the phase shifting method is used, and to unwrap the wrapped phase image, the mask-cut algorithm is used. The theoretical resolution of the DFP system is 2.6 μm.

Processing algorithms such as the phase wrapping and unwrapping algorithms are implemented in customized software developed using the C++ programming language. The RGM is integrated in the software to segment the PBGA package and PWB regions in the unpainted PWBA image using the software. Such integration is needed for measuring the warpage of the PBGA packages and the PWB in an unpainted PWBA using the DFP system.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

FIG. 15 depicts a block diagram of an illustrative computing device 300 according to an example implementation. Certain aspects of FIG. 15 may be embodied in the mobile device. Various implementations and methods herein may be embodied in non-transitory computer readable media for execution by a processor. It will be understood that the computing device 300 is provided for example purposes only and does not limit the scope of the various implementations of the communication systems and methods.

The computing device 300 of FIG. 15 includes one or more processors where computer instructions are processed. The computing device 300 may comprise the processor 302, or it may be combined with one or more additional components shown in FIG. 15. For example, in one example embodiment, the computing device 300 may be the processor 302. In yet other example embodiments, the computing device 300 may be a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

The computing device 300 may include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display 350 that is not necessarily physically connected to the mobile computing device. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to the external/remote display 350.

In an example implementation, the network connection interface 312 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 304 may be operatively coupled to a local display, such as a touch-screen display associated with a mobile device. In another example, the display interface 304 may be configured to provide video, graphics, images, text, other information, or any combination thereof for an external/remote display 350 that is not necessarily connected to the mobile computing device. In one example, a desktop monitor may be utilized for mirroring or extending graphical information that may be presented on a mobile device. In another example, the display interface 304 may wirelessly communicate, for example, via the network connection interface 312 such as a Wi-Fi transceiver to the external/remote display 350.

The computing device 300 may include a keyboard interface 306 that provides a communication interface to a keyboard. In one example implementation, the computing device 300 may include a presence-sensitive display interface 308 for connecting to a presence-sensitive display 307. According to certain example implementations of the disclosed technology, the presence-sensitive display interface 308 may provide a communication interface to various devices such as a pointing device, a touch screen, a depth camera, etc. which may or may not be associated with a display.

The computing device 300 may be configured to use an input device via one or more of input/output interfaces (for example, the keyboard interface 306, the display interface 304, the presence sensitive display interface 308, network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Example implementations of the computing device 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the computing device 300 includes a power source 330 that provides an appropriate alternating current (AC) or direct current (DC) to power components. According to an example implementation, the computing device 300 includes and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the term computing device, as used herein, may be a CPU, or conceptualized as a CPU (for example, the CPU 302 of FIG. 15). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

Software

The present invention further comprises digital fringe projection-dynamic digital fringe projection software for measuring the warpage of unpainted chip packages and boards. The present software generates a dynamic fringe pattern, in which a proper fringe intensity distribution is dynamically determined based on the surface reflectance of an unpainted sample in order to obtain better fringe image contrasts.

The software for measuring the warpage of painted and unpainted chip packages and boards was developed using the C++ programming language. All the processing algorithms need to measure the warpage of chip packages and boards, such as the phase wrapping and unwrapping algorithms are implemented in the software. Also, the software controls the camera to capture images and the projector to project and shift fringe patterns.

The software also automatically segments the chip package and PWB regions in a painted or unpainted PWBA image. Calibration methods to compensate the mismatches in coordinates and intensities between the projected and captured images are also implemented in the software.

Figure 16:
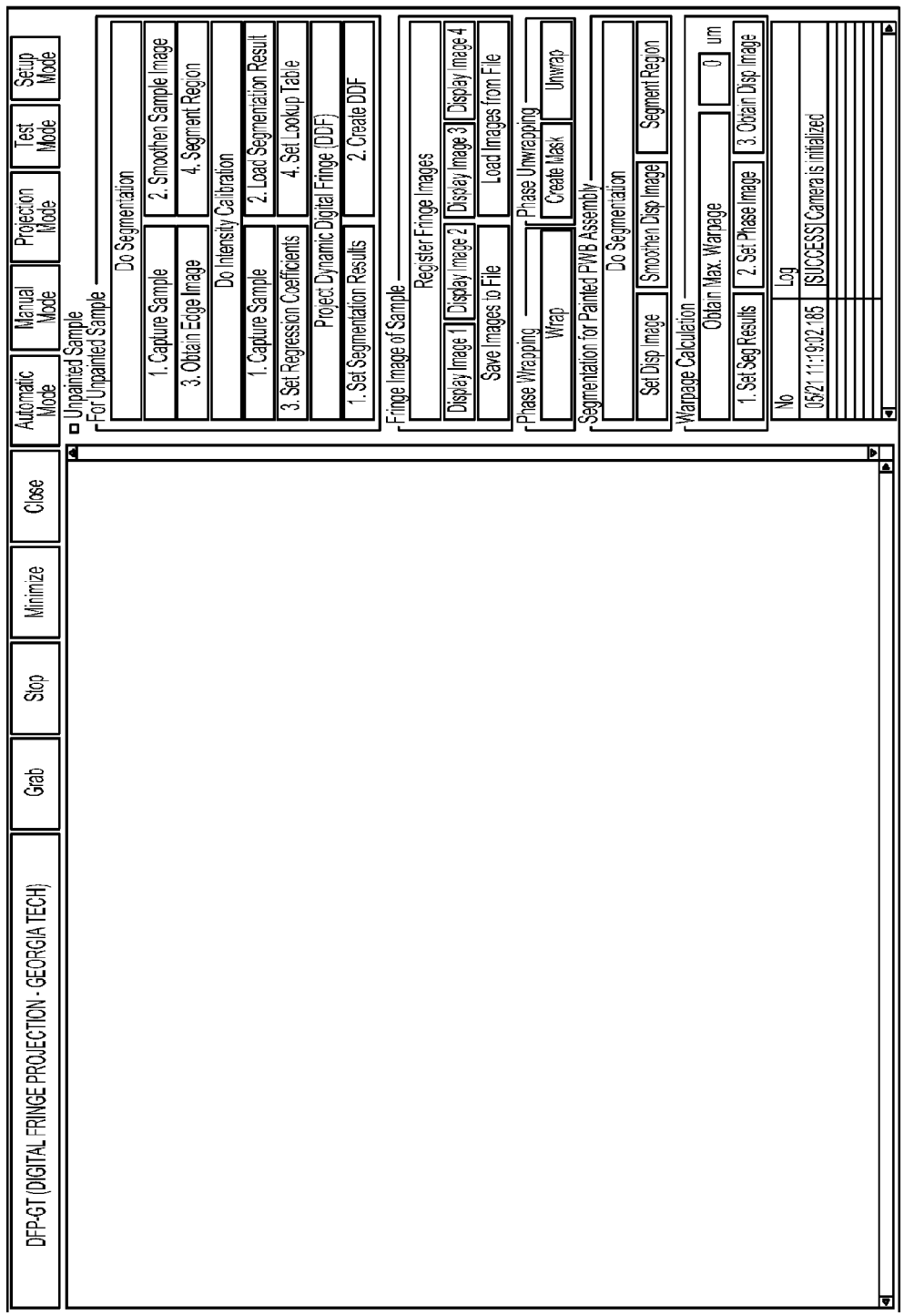
FIG. 16 is an exemplary user interface of software device according to an exemplary embodiment of the present invention.

The software can be used for any DFP systems for measuring the warpage of painted and unpainted chip packages and boards without requiring hardware modification of the DFP systems. A user interface of the software is shown in FIG. 16. Camera captured or processed images are displayed on the display panel and the user buttons are located on the control panel.

The followings are some of the features of the software:
The software is written in Microsoft Visual C++
The software can be called form the following environments:
  Microsoft Windows, version XP or higher
  Microsoft Visual C++, version 6.0 or higher
software controls:
  Camera to capture fringe image
  Projector to project and shift fringe image
software contains processing algorithms such as:
  Sinusoidal fringe pattern generation
  phase wrapping to increase measurement resolution
  phase unwrapping to remove the 2pi discontinuities in the wrapped phase
  Automatic chip package segmentation to segmented chip package and PWB regions in painted or unpainted PWBA image
software automatically performs calibration such as:
  Coordinate calibration between projected and captured images using the checker pattern and the projector-camera homography
  Intensity calibration between projected and captured images for painted samples using the lookup table method
  Intensity calibration between projected and captured images for unpainted samples using the lookup table and the polynomial regression methods Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A method of measuring warpage of a sample having a first region of a first surface reflectance and a second region of a second surface reflectance comprising:
projecting a dynamic fringe pattern onto the first and second regions, wherein the dynamic fringe pattern comprises an intensity distribution based upon the first surface reflectance and the second surface reflectance;
capturing phase-shifted fringe images of the dynamic fringe pattern reflected from the first and second regions of the sample;
generating a wrapped-phase image from the phase-shifted fringe images;
unwrapping the wrapped-phase image to obtain an unwrapped-phase image; and
converting the unwrapped-phase image into a displacement image indicative of warpage of the first region and the second region of the sample.

2. The method of claim 1, wherein:
the sample comprises a printed wiring board assembly (PWBA);
the first region of the PWBA comprises one or more chip packages; and
the second region of the PWBA comprises a printed wiring board.

3. The method of claim 1 further comprising generating the dynamic fringe pattern by:
projecting a uniform image onto the sample;
capturing a reflected surface image of the sample;
converting coordinates of the regions in the captured image to coordinates in the projected image after calibrating coordinate mismatches between captured and projected images; and
calibrating intensity mismatches between captured and projected images for each of the regions;
wherein the dynamic fringe pattern contains sinusoidal fringes with different intensity distributions for each of the regions.

4. The method of claim 3, wherein calibrating coordinate mismatches between captured and projected images comprise obtaining coordinate transfer functions (CTFs) between the projected and captured images.

5. The method of claim 3, wherein calibrating coordinate mismatches between captured and projected images comprise:
capturing a checker pattern image of the sample, which checker pattern divides a captured image and a projected image into a plurality of divisions;
obtaining similar coordinates of at least a portion of the divisions in the captured image;
obtaining a coordinate transfer function (CTF) that transfers coordinates from the captured image to the projected image; and
calculating specific coordinates in the projected image from those in the captured image using the CTF.

6. The method of claim 3, wherein the divisions are square division; and
wherein obtaining similar coordinates of at least a portion of the divisions in the captured image comprises obtaining the coordinates two or more corners of at least a portion of the square divisions in the captured image.

7. The method of claim 3, wherein calibrating coordinate mismatches between captured and projected images comprises:
generating a checker pattern;
projecting the checker pattern onto the sample;
capturing a checker pattern image of the sample, which checker pattern divides a captured image and a projected image into a plurality of divisions;
obtaining similar coordinates of at least a portion of the divisions in the captured image;
obtaining a coordinate transfer function (CTF) that transfers coordinates from the captured image to the projected image; and
calculating specific coordinates in the projected image from those in the captured image using the CTF.

8. The method of claim 3, wherein calibrating intensity mismatches between captured and projected images for each of the regions comprises:
projecting uniform images with different intensities onto the sample and capturing those images;
obtaining a third-order polynomial regression equation between projected and captured intensities using the projected and captured images;
using the regression equation as the intensity transfer function (ITF) for the sample; and
calculating specific intensities in the projected image from those in the captured image using the ITF.

9. The method of claim 3 further comprising:
segmenting the sample into the first region and the second region prior to projecting the dynamic fringe pattern.

10. The method of claim 9, wherein segmenting the sample comprises:
capturing a capture image of the sample;
smoothening the capture image using a Gaussian filter to generate at least two smoothened features;
generating edges around the smoothened features using a Canny algorithm to generate an edged image having at least two edged regions;
segmenting the edged regions in the edged image with labels using a region-growing algorithm to generate a label image having the first and second regions; and
detecting the first and second regions in the label image using geometric analysis.

11. A method of measuring warpage of at least a portion of a PWBA having a first region of a first surface reflectance and a second region of a second surface reflectance comprising:
projecting a dynamic fringe pattern onto the first and second regions, wherein the dynamic fringe pattern comprises an intensity distribution based upon the first surface reflectance and the second surface reflectance, the dynamic fringe pattern containing sinusoidal fringes with different intensity distributions for each of the regions;
capturing phase-shifted fringe images of at least a portion of the dynamic fringe pattern reflected from the first and second regions of at least a portion of the PWBA;
generating a wrapped-phase image from the phase-shifted fringe images;
unwrapping the wrapped-phase image to obtain an unwrapped-phase image; and
converting the unwrapped-phase image into a displacement image indicative of warpage of the first region and the second region of at least a portion of the PWBA.

12. The method of claim 11, wherein:
the first region of the PWBA comprises one or more chip packages; and
the second region of the PWBA comprises a printed wiring board.

13. The method of claim 11 further comprising performing coordinate calibration between the projected dynamic fringe image and the captured phase-shifted fringe images.

14. The method of claim 11 further comprising performing intensity calibration between the projected dynamic fringe image and the captured phase-shifted fringe images.

15. The method of claim 11 further comprising segmenting the PWBA into the first region and the second region prior to projecting the dynamic fringe image.

16. The method of claim 15, wherein segmenting the PWBA comprises:
capturing a capture image of the PWBA;
smoothening the capture image using a Gaussian filter to generate at least two smoothened features;
generating edges around the smoothened features using a Canny algorithm to generate an edged image having at least two edged regions;
segmenting the edged regions in the edged image with labels using a region-growing algorithm to generate a label image having the first and second regions; and
detecting the first and second regions in the label image using geometric analysis.

17. A method of measuring warpage of a sample having a first region of a first surface reflectance and a second region of a second surface reflectance comprising:
segmenting the sample into the first region and the second region;
generating a dynamic projected image from a dynamic fringe pattern, the dynamic fringe pattern comprising sinusoidal fringes with different intensity distributions for each of the regions;
projecting the dynamic projected image onto the first and second regions, wherein the dynamic projected image comprises an intensity distribution based upon the first surface reflectance and the second surface reflectance;
capturing phase-shifted images of the dynamic projected image reflected from the first and second regions of the sample;
generating a wrapped-phase image from the phase-shifted images;
unwrapping the wrapped-phase image to obtain an unwrapped-phase image; and
converting the unwrapped-phase image into a displacement image evidencing warpage of the first region and the second region of the sample.

18. The method of claim 17, wherein segmenting the sample comprises:
capturing a capture image of the sample;
smoothening the capture image using a Gaussian filter to generate at least two smoothened features;
generating edges around the smoothened features using a Canny algorithm to generate an edged image having at least two edged regions;
segmenting the edged regions in the edged image with labels using a region-growing algorithm to generate a label image having the first and second regions; and
detecting the first and second regions in the label image using geometric analysis.

19. The method of claim 17 further comprising performing coordinate calibration between the projected dynamic image and the captured phase-shifted images.

20. The method of claim 17 further comprising performing intensity calibration between the projected dynamic image and the captured phase-shifted images.

* * * * *